US007072767B2

(12) United States Patent
Routh et al.

(10) Patent No.: US 7,072,767 B2
(45) Date of Patent: Jul. 4, 2006

(54) SIMULTANEOUS INVERSION FOR SOURCE WAVELET AND AVO PARAMETERS FROM PRESTACK SEISMIC DATA

(75) Inventors: Partha Sarathi Routh, Houston, TX (US); Phil D. Anno, Houston, TX (US); Robert T. Baumel, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 317 days.

(21) Appl. No.: 10/404,887

(22) Filed: Apr. 1, 2003

(65) Prior Publication Data

US 2004/0199330 A1     Oct. 7, 2004

(51) Int. Cl.
*G01V 1/28* (2006.01)
(52) U.S. Cl. ............................................ 702/14; 703/5
(58) Field of Classification Search ................ 702/14, 702/2, 13, 16; 367/38, 21, 24; 700/8; 708/274

See application file for complete search history.

(56) References Cited

U.S. PATENT DOCUMENTS

| 3,510,634 | A | * | 5/1970 | Mueller, Jr. et al. ......... 708/274 |
| 3,515,860 | A | * | 6/1970 | Fitzgerald, Jr. ................. 700/8 |
| 5,297,108 | A | * | 3/1994 | Swan ............................ 367/38 |
| 5,986,973 | A | * | 11/1999 | Jericevic et al. .............. 367/24 |
| 6,594,585 | B1 | * | 7/2003 | Gersztenkorn ................ 702/14 |
| 6,665,615 | B1 | * | 12/2003 | Van Riel et al. ................ 702/2 |
| 6,832,160 | B1 | * | 12/2004 | Vinje ............................ 702/14 |

OTHER PUBLICATIONS

Dave Nichols, Velocity-Stack Inversion using Lp-norms, Standford Exploration Project, Report 82, pp. 1-17.*
Jonathan Downton, Three term AVO waveform inversion, Core Laboratories Reservoir Technologies Division Calgary, University of Calgary, 2004 CSEG National Concention publication, pp. 1-12.*
Nathan W. Winslow et al.; *Source Inversion: Not a Miracle*, The Rice Inversion Project, W. W., 2000, pp. 1-14.
Susan E. Minkoff et al.; *Estimating the energy source and reflectivity by seismic inversion*, The Rice Inversion Project, Inverse Problems, II 1995, pp. 1-19, Figs. 1-6c.
Douglas C. Nyman et al.; *Seismic Wavelet Estimation Using Well Control*, 1987, 57th Ann. Internat. Mtg.: Soc. of Expl. Geophysics, MAR 2.6, pp. 211-213, Figs. 1-3c.

(Continued)

*Primary Examiner*—John Barlow
*Assistant Examiner*—Victor J. Taylor
(74) *Attorney, Agent, or Firm*—Madan, Mossman & Sriram, PC

(57) ABSTRACT

The present invention provides for a method and apparatus for seismic data processing. Prestack seismic data is obtained that contains a plurality of reflectors. Non-parallel moveout of the plurality of reflectors is utilized to determine a source wavelet using an L2-Norm and a reflectivity parameter using an L1-Norm. The source wavelet and reflectivity parameters can be determined simultaneously. Source and reflectivity determination may further comprise minimization of a model objective function. The model objective function may be a function of at least one of i) said source wavelet, ii) a gradient parameter and iii) an intercept parameter. An AVO intercept and gradient parameters can be determined using the determined source wavelet and reflectivity parameter. Constraints may be placed on parameters to ensure physically realistic solutions.

20 Claims, 15 Drawing Sheets

OTHER PUBLICATIONS

Jacob M. Pedersen et al.; *Simulated Annealing-Based Seismic Inversion*, S13.3, 61st Annual International Meeting: Soc. of Expl. Geophys., pp. 941-944, 5 Figs.

T. J. Ulrych; *Application of Homomorphic Deconvolution To Seismology*, Geophysics, vol. 36, No. 4 (Aug. 1971), pp. 650-660, 36 Figs.

Steven R. Rutherford et al.; *Amplitude-versus-offset variations in gas sands*, Geophysics, vol. 54, No. 6 (Jun. 1989), pp. 680-688, 12 Figs.

L. Neil Frazer et al.; *New objective functions for waveform inversion*, Geophysics, vol. 69, No. 1 (Jan.-Feb. 1998), p. 213-222, 10 Figs.

Z. Ziolkowski, *Why don't we measure seismic signatures?*, Geophysics, vol. 56, No. 2 (Feb. 1991), pp. 190-201, 8 Figs.

Norbert M.L. Van De Coevering; *Wavelet Estimation and Zero-Phasing by Integrating Seismic and Well-Based Methods*, EAGE 62nd Conference and Technical Exhibition May 29-Jun. 2, 2000, pp. 1-4, 2 Figs.

L. R. Lines et al.; *The old and the new in seismic Deconvolution and Wavelet Estimation*, Official Journal of the European Association of Exploration Geophysicists, vol. 25, No. 3, Sep. 1977, pp. 512-540, 12 Figs.

Gilberto R. De Lima et al.; *Robustness of a New Source-Signature Estimation Method Under Realistic Data Conditions: A Deterministic-Statistical Approach*, SP2.8, pp. 1658-1660, 4 Figs.

Gregory D. Lazear, *Mixed-Phase Wavelet Estimation Using Fourth-Order Cumulants*, Geophysics, vol. 58, No. 7, (Jul. 1993), pp. 1042-1051, 14 Figs.

S. Levy et al.; *The deconvolution of phase-shifted wavelets*, Geophysics, vol. 47, No. 9 (Sep. 1982), pp. 1285-1294, 4 Figs., 1 Table.

Zhengping Liu et al.; *Seismic wavelet estimation constrained by well data using artificial neural networks*, SEG 2000 Expanded Abstracts, pp. 1-4, 3 Figs.

Ken Matson, *An overviewof wavelet estimation using free-surface multiple removal*, The Leading Edge, Jan. 2000, pp. 50-55.

Susan E. Minkoff et al.; *Full waveform inversion of marine reflection data in the plane-wave domain*, Geophysics, vol. 62, No. 2 (Mar.-Apr. 1997), 16 Figs., 1 Table.

Susan E. Minkoff et al.; *Simultaneous determination of the Source-Time Function and Reflectivity via Inversion*, S13.4, pp. 649-652, 6 Figs.

D. W. Oldenburg et al., *Wavelet estimation and deconvolution*, Geophysics, vol. 46, No. 11 (Nov. 1981); pp. 1528-1542, 10 Figs.

D. W. Oldenburg et al:, *Recovery of the acoustic impedance from reflection seismograms*, Geophysics, vol. 48, No. 10, (Oct. 1982), pp. 1318-1337, 14 Figs.

D. W. Oldenburg et al., *Root-mean-square velocities and recovery of the acoustic impedance*, Geophysics, vol. 49, No. 10 (Oct. 1984), pp. 1653-1663, 9 Figs., 1 Table.

Milton J. Porsani et al.; *Mixed-phase deconvolution and wavelet estimation*, The Leading Edge, Jan. 2000, pp. 76-79, 6 Figs.

Enders A. Robinson; *Predictive Decomposition of Time Series with Application to Seismic Exploration*, Geophysics, vol. XXXII, No. 3, (Jun. 1967), pp. 418-484, 11 Figs., 1 Table.

Enders A. Robinson; *Wavelet estimation and Einstein deconvolution*, The Leading Edge, Jan. 2000, pp. 56-60, 6 Figs.

Mauricio D. Sacchi et al.; *Nonminimum-phase wavelet estimation using higher order statistics*, The Leading Edge, Jan. 2000, pp. 80-83.

Tadeusv J. Ulrych et al.; *Wavelet estimation revisited*, The Leading Edge, Nov. 1995, pp. 1139-1143, 5 Figs.

Danilo R. Velis et al.; *Simulated annealing wavelet estimation via fourth-order cumulant matching*, Geophysics, vol. 61, No. 6 (Nov.-Dec. 1996), pp. 1939-1948, 7 Figs.

Arthur B. Weglein et al.; *Wavelet estimation for a multidimensional acoustic or elastic earth*, Geophysics, vol. 55, No. 7 (Jul. 1990), pp. 902-913, 11 Figs.

Anton Ziolkowski; *Simplified wavelet estimation using source-signature measurements*, The Leading Edge, Jan. 2000, pp. 61-67, 9 Figs.

\* cited by examiner

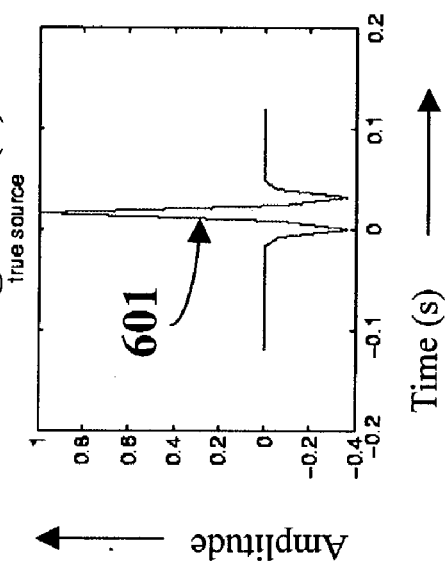
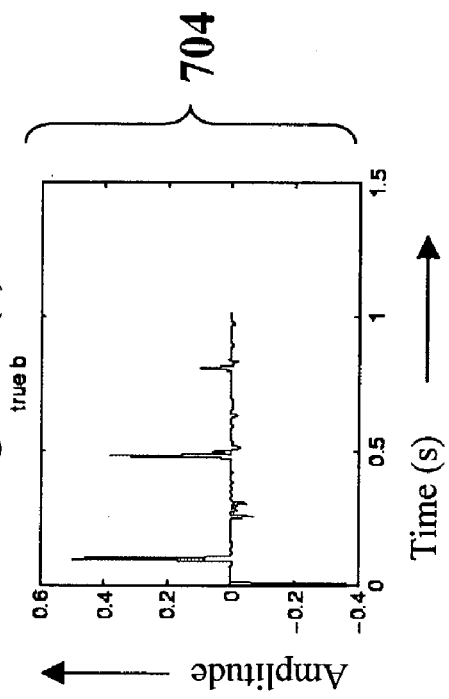
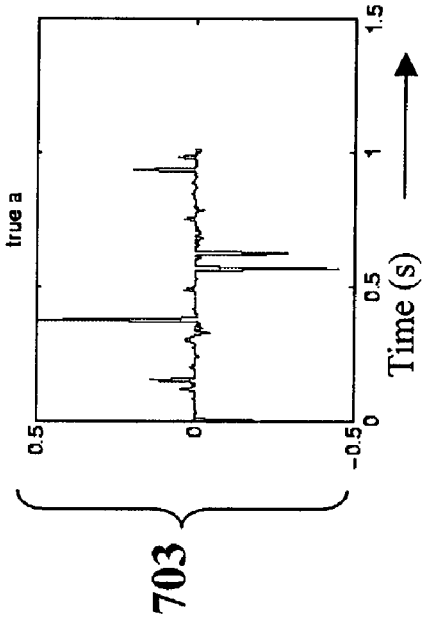

Time (s) →

SIMULTANEOUS INVERSION FOR SOURCE WAVELET AND AVO PARAMETERS FROM PRESTACK SEISMIC DATA

FIELD OF THE INVENTION

This invention relates to the field of geophysical prospecting and, more particularly, to a method for source wavelet inversion contemporaneous with determination of AVO parameters.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes. The resulting seismic data may be processed to yield information relating to the location of the subsurface reflectors and the physical properties of the subsurface formations.

Recorded data is a combination of source wavelet and earth properties. The ultimate goal of seismic data processing is to interpret earth properties without the complication of the source wavelet. Reflectivities, including 'Amplitude Variation with Offset' or angle parameters (AVO), characterize earth properties and can also be used as input to other prestack inversion algorithms. At the same time, the source wavelet is useful for a variety of seismic processing algorithms, including: (a) phase correction of seismic data, (b) wavelet shaping and deconvolution of seismic data, (c) offset-dependent tuning correction, (d) forward modeling of seismic data and (e) free-surface multiple elimination.

Amplitude variation with angle/offset (AVA/AVO) is the variation in the amplitude of a seismic reflection with the angle of incidence or source-geophone distance. The variation depends on changes in velocity, density, and Poisson's ratio. It is often used as a hydrocarbon gas indicator because gas generally decreases Poisson's ratio and often increases amplitude with incident angle/offset. Other conditions can produce similar effects. The amplitude of an event is often plotted against $\sin^2 \theta$ or ($\sin^2 x$), where $\theta$ is incidence angle (and x is offset), and the slope or gradient of a best-fit line is measured as the indicator:

$$A(\theta) = A \; 30 \; B \sin^2 \theta.$$

Because measurements have to be made with prestack data, the noise level is usually large. The gradient is often determined by the ratios of amplitudes of large-offset to short-offset stacks. Different types of reservoirs have different responses to seismic energy impinging on reservoir surfaces, and these are separated into classes. Amplitude versus angle/offset Class 1 reservoirs have higher impedance than the surrounding rocks, class 2 are those with very small, either positive or negative, impedance contrast, and class 3 are low-impedance reservoirs. In Tertiary clastic sections, class 1 reservoirs often yield dim spots, class 3 bright spots, and class 2 reservoirs are difficult to see unless they have appreciable increase of amplitude with offset. Class 4 reservoirs are low-impedance reservoirs where the magnitude of the response decreases with offset (Rutherford and Williams, 1989).

The effective source wavelet is difficult to measure in practice. The effective source wavelet can be influenced by near-surface structure in the vicinity of the source. Moreover, separation of source and reflectivity via inversion is inherently ill-determined. In a strict mathematical sense it is indeterminate from poststack data alone. Non-parallel moveout information in prestack data, however, provides some degree of leverage to distinguish between source wavelet and reflectivity via prestack inversion. Moveout is the difference in arrival times due to source-to-receiver distance differences.

Prior art methods to estimate the source wavelet and reflectivity can be broadly classified into four approaches. These four approaches are: 1) source wavelet and reflectivity separation using statistically based assumptions, 2) extraction using known reflectivities, 3) inversion/extraction using a known source wavelet, and 4) simultaneous inversion for source and reflectivity. The first three can be applied to either poststack or prestack data and only the fourth method is specific to prestack data.

Separation of source wavelet and reflectivity based on statistical assumptions constrain what would otherwise be an indeterminate problem. The most widely used method is spiking deconvolution where reflectivity is considered to be white and the source is assumed to be minimum phase (Robinson, 1967). Other statistical methods include a $4^{th}$-order cumulant approach (Lazear, 1984), the maximum entropy method (Lines and Ulrych, 1977) and homomorphic deconvolution (Ulrych, 1971).

Extraction of source wavelet given known reflectivities is a class of methods that are linear and well-determined in a mathematical sense. The most widely used approach first obtains reflectivities from well logs. Other approaches obtain reflectivities by assuming that certain bright events in seismic data correspond to simple, sharp reflecting interfaces (Buland and More, 2001; Nyman et al., 1996). With either approach the wavelet is then extracted by relating the seismic data with the known reflectivities.

Inversion for reflectivity given a known source wavelet is a less well-determined approach because the bandwidth of seismic data is always less than the bandwidth of the desired reflectivities. One of the common prior art methods is sparse spike inversion using an L1-Norm to extend the bandwidth of the output reflectivity sequence (Oldenburg et al, 1983). Other methods in this class include nonlinear inversion for reflectivity by sparse parameterization and global optimization (Pedersen et al., 1991).

Bill Symes and other researchers at Rice University introduced the concept of simultaneous inversion to separate source and reflectivity based on non-parallel moveout in prestack data, and have given mathematical proofs-of-concept under simple conditions. Prior art studies using the non-parallel moveout concept have obtained mixed results; sometimes the results demonstrated difficulties in convergence (Minkoff and Symes, 1995; Winslow et al., 2000).

There is a need for a fast and efficient method of inverting for source and AVO parameters that quickly leads to an acceptable and stable solution. The present invention satisfies this need.

BRIEF DESCRIPTION OF THE DRAWINGS

The present invention and its advantages will be better understood by referring to the following detailed description and the attached drawings in which:

FIG. 2(a) shows a shifted Ricker wavelet with a 30 Hz dominant frequency;

FIG. 2(b) illustrates the model intercept parameter;

FIG. 2(c) illustrates the model gradient parameter;

Figure 1:
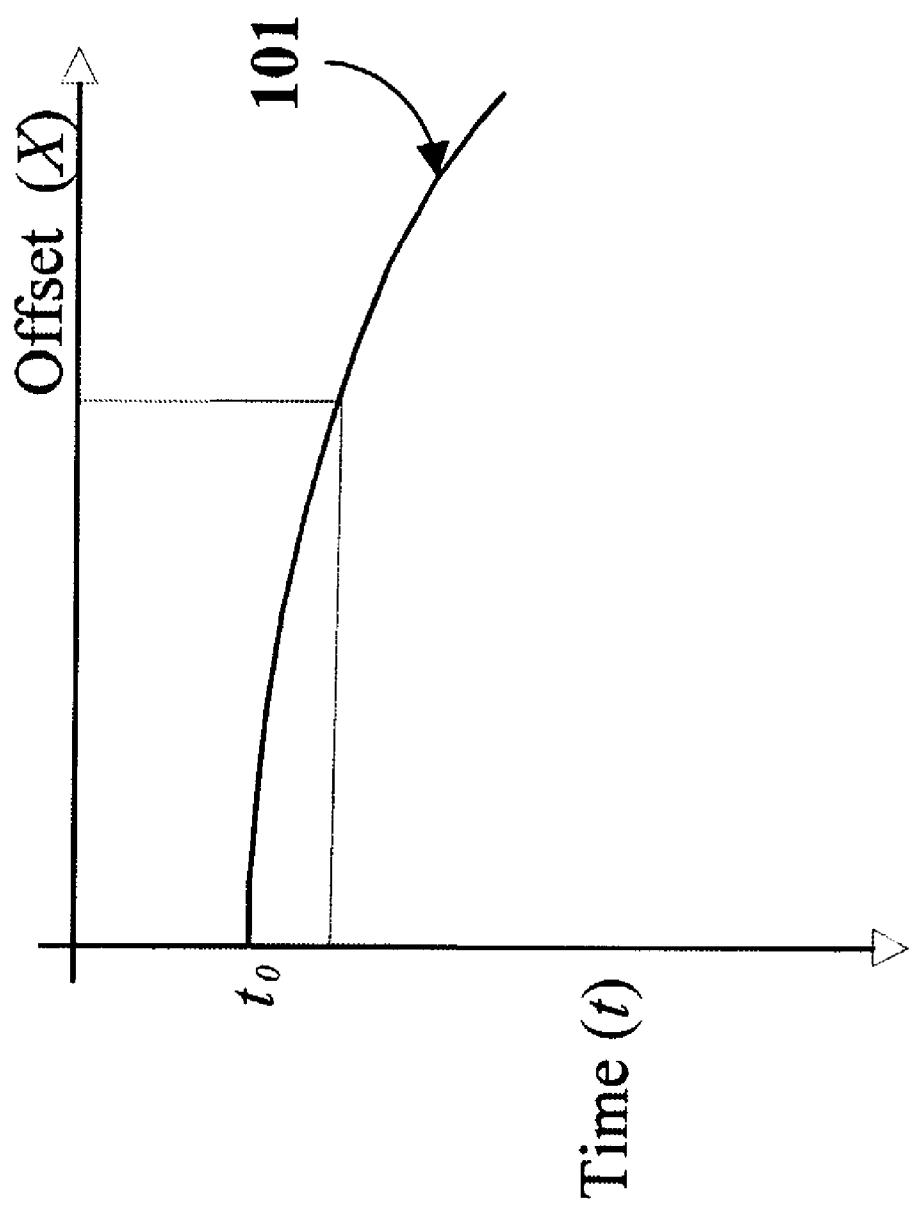
FIG. 1 illustrates a hyperbolic moveout curve in the t-X domain with a vertex at $t_i$.

The patent or application file contains at least one drawing executed in color. Copies of this patent or patent application publication with color drawing(s) will be provided by the Office upon request and payment of the necessary fee. While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

SUMMARY

The present invention provides a method of obtaining a source wavelet and AVO parameters from seismic data. Prestack seismic data is obtained that contains a plurality of reflectors. A model objective function is minimized while utilizing the non-parallel moveout of the plurality of reflectors. A source wavelet is determined using an L2-Norm and AVO parameters intercept and gradient using L1-Norms.

The invention provides a method to invert prestack seismic data to simultaneously recover a source wavelet and reflectivity parameters. The method utilizes the non-parallel moveout of a plurality of reflectors in prestack data to obtain estimates of source and reflectivity parameters simultaneously. Appropriately mixed norms for the source wavelet and the reflectivity parameters improve the robustness of the inversion. The method accommodates amplitude variation with offset so that AVO parameters can be determined from the inversion. Physically realizable parameters may optionally be required to constrain the source wavelet and reflectivity parameters in the inversion process.

The source wavelet estimation or AVO parameter extraction is a linear problem, however the combined problem is nonlinear. The motivation for solving the problem simultaneously arises when both the source function and the AVO parameters are unknown. The purpose of this problem is to separate the contribution of source effect and reflectivity in the seismic signal. This is achieved by utilizing the non-parallel reflector moveout information in the prestack gather (i.e., differential moveout information between reflectors in the prestack data). The forward problem is formulated as a convolution of the source wavelet with offset dependent reflectivity along hyperbolic moveout. This allows use of prestack gather data directly for the inverse problem.

The inverse problem is formulated by imposing suitable constraints on the source and AVO parameters resulting in a mixed norm problem. In addition to these constraints, we impose physical bounds on AVO parameters that prevent the recovered solution from attaining unrealistic values. A preferred embodiment of the present invention is the time-domain methodology in which the source wavelet is parameterized in time and the AVO parameters as a function of zero-offset time. The method is illustrated by inverting a synthetic data example followed by field data example. Synthetic examples demonstrate that the present invention provides a method that is robust and has the ability to recover the source and AVO parameters within a scale factor. Results from the real data set are excellent, in addition to recovering a source wavelet at each common depth point (CDP); the recovered AVO parameters have good resolution with high frequency content.

The present invention provides for a nonlinear inversion methodology to extract source wavelet and AVO parameters simultaneously from prestack seismic data. While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention provides a method and system to invert prestack seismic data to simultaneously recover a source wavelet and reflectivity parameters, including AVO parameters. The method utilizes the non-parallel moveout of a plurality of reflectors in prestack data to obtain estimates of source and reflectivity parameters simultaneously. Appropriately mixed norms for the source wavelet and the reflectivity parameters improve the robustness of the inversion. The method accommodates amplitude variation with offset, which means that AVO parameters can be determined from the inversion. Physically realizable parameters constrain the source wavelet and reflectivity parameters in the inversion process. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

The forward modeling component of this inversion features several alternatives. Forward modeling consists of deriving a prestack impulse response from the reflectivities and a known velocity model, and convolving this response with the source wavelet. Reflectivity may be parameterized in time or depth coordinates. In the absence of complex geological structure the preferred embodiment is to parameterize the reflectivity in terms of zero-offset time in order to improve computational efficiency. The source may be parameterized either in the frequency or time domain.

The inverse component is formulated by minimizing a model objective function subject to fitting the prestack data. The important aspect of the inversion methodology is that the generic model objective function that is minimized provides great flexibility to generate different models. With a properly designed objective function it is possible to incorporate additional information about the distribution of desired parameters and to generate a model that is in accordance with geologic constraints as desired. Such a model may be regarded as a best estimate for the true earth parameters. However, altering the objective function and carrying out additional inversions allows exploration of model space and provides an indication of which features are demanded by the data.

The model objective function may include mixed norms for the source and reflectivity parameters. The preferred embodiment for the mixed norm is a compact L2-Norm for the source wavelet and approximate L1-Norm for the reflectivity parameters. An approximate L1-Norm produces discontinuous (spiky) solutions for the reflectivity parameters, in general agreement with the physical nature of reflectivity measurements. In the preferred embodiment the model objective function is flexible enough to incorporate a priori information about the source, the reflectivity parameters, or both. The objective function is minimized in an iterative manner. In general, physical bounds on the inverted parameters can be imposed using nonlinear mapping, nonlinear programming approaches, the interior point method, etc. The preferred embodiment is to use the interior point method.

Prestack inversion is increasingly gaining acceptance in the seismic industry to obtain enhanced information about subsurface rock properties. Increases in processor speeds in addition to fast numerical algorithms have made it possible to invest effort in developing and implementing methods that add value to seismic data acquisition and exploration programs. The basic difficulty in nonlinear prestack inversion is the complexity of the problem for handling large data volumes and providing a stable method to recover the source signature and the earth properties simultaneously. The method of the present invention is derived from a formulation of the problem from intuitive understanding of the data rather than incorporating all of the complexities of prior art wave propagation modeling methods in the procedure. The present invention provides a practical method to recover the source wavelet and the AVO parameters simultaneously from multi-offset prestack seismic gathers. It is well recognized that source estimation is an important step in the seismic data processing and inversion. Inaccurate estimation of the source function can lead to incorrect estimates of earth parameters (Ziolkowski, 1991; Minkoff and Symes, 1997; Winslow et al., 2000, Frazer and Sun, 1998). A common prior art practice has been to estimate the source independently of the earth parameters. This includes number of approaches like spiking deconvolution (Robinson, 1967; Levy and Oldenburg, 1982; de Lima et al., 1990), fourth-order cumulent matching (Lazear, 1993; Velis and Ulrych, 1996; Sachhi and Ulrych, 2000), estimating source from well logs (Van de Coevering, 2000; Liu and Castagna, 2000; Buland and More, 2001), from water bottom reflections (Alai, 1998), and from strong reflectors like top of salt, and also direct measurement of source signature in marine environments (Ziolkowski, 2000). Some of these methods rely on the knowledge of the earth parameter to deconvolve the source signature, whereas other methods (like fourth order cumulant) rely on statistical information in the data to extract the source information. In most of these cases estimation is carried out with post-stack data sets, although some of these methods can be applied to prestack data as well.

If the assumptions about the earth parameters are incorrect or the statistical assumptions about the data are violated the source estimate can be incorrect. An alternative approach is to solve for source and earth parameters simultaneously. This approach was proposed by researchers at the Rice inversion project (TRIP) (Minkoff and Symes, 1995, 1997; Winslow et al., 2000). The basic objective is to extract the source and the reflectivity information by utilizing the differential moveout information in the data, that is, the non-parallel moveout in the CDP gathers. The formulation of the forward problem and the inversion procedure differ significantly from prior art simultaneous source-reflectivity inversion approaches; the present invention is easier and more practical to implement.

The method of the present invention is described herein from a formulation of the forward problem in the time domain instead of the depth domain. The AVO parameters are parameterized in terms of zero-offset travel time instead of depth. The choice of this parameterization provides implementation advantages for a fast forward model and eliminates the need to carry out ray tracing to compute the forward responses. Recognizing that computation of sensitivity can be expensive, especially in full waveform inversion, this formulation provides the flexibility to easily compute the sensitivities for the source and AVO parameters.

The method of the present invention may be implemented in both the time and frequency domains. Whether to use the time or frequency domain approach is based on the choice of domain for source parameterization. As an example of the method we disclose a time domain implementation where the source is parameterized as a function of time sample with a specified window length. The forward problem can be described as a mapping in time, i.e. from zero-offset travel time to hyperbolic moveout time, which is similar to a time-migration approach. This makes the method very efficient compared to depth domain approaches where the AVO parameters are discretized in depth. In a depth domain approach the mapping from depth to time requires the additional step to compute the travel times using ray tracing. The forward model is expressed as a convolution between the source wavelet and the AVO parameters and therefore handles primaries-only data. Primaries-only seismic data are date without 'multiples.' Multiples are events or arrivals of seismic energy that have been reflected more than once.

In a preferred embodiment, the prestack seismic data used in the present invention will have any necessary preconditioning processing applied prior to inversion. Removing multiples as outlined above is one type of processing well known to practitioners of the art. Processing techniques for the removal of other noise types, unwanted energy and interference are well known in the seismic processing arts.

After developing a forward problem that adequately describes the primaries-only data, the next goal is to solve the inverse problem that recovers the three types of parameters from a finite set of data. The inverse problem is posed as an under-determined problem where there are more model parameters than data. In practice, although there are more data than model parameters, the problem can be considered to be underdetermined due to ill-posedness of the system (leading to rank deficiency). This introduces non-uniqueness into the solution. To overcome non-uniqueness, we minimize a suitable norm of the model parameters based on a constraint of fitting the data within a tolerance level. For example, in the frequency domain the real and imaginary part of the source parameter has smooth variation with frequency, whereas the AVO parameters are spiky in nature, indicating that they are discontinuous as function of two-way travel time. Based on this observation a L2-Norm measure is chosen as being suitable for the source and a L1-Norm is chosen as suitable for AVO parameters that allows preservation of the discontinuities. The L1-Norm inversion is commonly used in the post-stack acoustic impedance inversion and implemented using linear programming techniques (Oldenburg et al., 1984, 1988, 1983; Levy et al., 1984). Currently, there are number of commercial packages that solve the post-stack reflectivity inversion problem using L1-Norm minimization like Hampson and Russell, Jason Geosystems.

In a frequency domain formulation, we also penalize the derivative of the source in the frequency domain. This allows us to recover a compact minimum energy wavelet that will satisfy our data. In the time domain the compactness is imposed by choosing a suitable time length for the wavelet (like 100 msec or 200 msec). The L1-Norm in a preferred embodiment of the present invention is implemented using iterative reweighted least squares method (IRLS) (Farquharson and Oldenburg, 2000). IRLS provides the flexibility to work with different types of Lp-Norm measures. For example, we have implemented different types of L1-Norms like Huber norm, Ekblom norm and approximate L1-Norm measures as variants of this invention.

The model objective function in the inverse problem also has the flexibility to incorporate a priori information. For example, an a priori model for the AVO parameters can be determined from well log data and included as a reference model in the inversion. In such a situation the inversion will try to find a model perturbation from the reference model that can satisfy the data. If there is no a priori information the reference model can be chosen to be zero. The data misfit function or cost function is an L2-Norm between the observed data and the predicted data normalized by the standard deviation of the data error.

In addition to L2-Norm and L1-Norm constraints on the source and AVO parameters in the inverse problem, lower and upper bounds on the AVO parameters may be imposed. The rationale for imposing this constraint is to ensure AVO parameters that have realistic values. For example, the reflectivity is bounded between [−1,1]. The bounded minimization problem is solved using an interior point method. In particular we use a primal formulation of the interior point method, in which we introduce a logarithmic barrier function in our objective function that prevents the solution of the AVO parameters from exceeding the imposed bounds. The interior point method is a stable and efficient formulation for solving bounded minimization problems compared to other methods like Linear Programming. The nonlinear inverse problem can be transformed to an optimization problem which is solved using a standard Gauss-Newton approach with regularization and step length search. The system of equations arising from the minimization procedure is solved using conjugate gradient with least-squares (CGLS) method which is efficient and requires minimal storage.

This section describes the forward modeling procedure to generate seismic waveforms that include the AVO effects and a source wavelet. The convolutional model between the source and the reflectivity for a horizontally layered earth model is assumed to be valid.

The starting point of derivation is the hyperbolic moveout curve shown in FIG. 1. The relationship of receiver Offset (X) to seismic event arrival Time (t) is illustrated by the hyperbolic moveout curve 101 in the t-X domain with 0-offset distance time intercept at $t_0$. As the vertex (0-offset time intercept, $t_0$) of every moveout curve changes with time or depth, each hyperbolic moveout curve is different as well, and so the reflectors are non-parallel. This property is one of the bases for obtaining estimates of source and reflectivity parameters simultaneously in prestack data.

To model the AVO effects we consider a reflectivity model given by $$r(t_0, \theta) = a(t_0) + b(t_0)\sin^2\theta \quad (1)$$

where $a(t_0)$ and $b(t_0)$ are the intercept and slope parameters that describe the variation of reflectivity with angle and $t_0$ is the normal incidence two-way travel time. The AVO parameters $a(t_0)$ and $b(t_0)$ are unit-less parameters, therefore $r(t_0, \theta)$ is unit-less also, and $\theta$ is the reflection angle. In the above definition of angle dependent reflectivity AVO is parameterized in zero-offset travel time to avoid ray tracing, but to compute the reflection angle $\theta$, ray tracing is necessary in general. To circumvent the ray tracing requirement, a small angle assumption is used, i.e. offsets that are much smaller than reflections. This allows use of an approximation for $\sin\theta$ given, $$\sin\theta(t_0) = \frac{xV_i(t_0)}{tV^2(t_0)} \quad (2)$$

where $V_i(t_0)$ is the interval velocity of the medium and t is the moveout time. The reflectivity function at any t and offset x can then be analytically expressed as $$r(t, x) = \int_{t_0^{min}}^{t_0^{max}} [a(t_0) + b(t_0)\sin^2\theta]\delta\left(t - \sqrt{t_0^2 + x^2/V^2(t_0)}\right) dt_0 \quad (3)$$

where the moveout time is given by $t_{moveout} = \sqrt{t_0^2 + x^2/V^2(t_0)}$. This definition for reflectivity implies that the zero offset reflectivity given by equation (1) follows the moveout curve. The above equation can also be viewed slightly differently: If we take a gather and remove the effect of the wavelet, the resultant gather will be described by equation (3). So in effect the spikes will follow the moveout trajectory and at each t, x the amplitude of the spike will be given by equation (1). In equation (3), reflectivity is expressed as function of time and offset. This is just a convention and there is no loss of generality, since the angle is a function of the offset given by equation (2). Note that the formulation of such a forward model gives flexibility to choose any offset dependent reflectivity definition as long as there is a mapping from offset to angle. To obtain the amplitude waveform responses at time t and at offset x we convolve the source wavelet s(t) with the reflectivity function r(t,x) in equation (3). This yields $$u(t, x) = s(t) \otimes r(t, x) \quad (4)$$
$$= s(t) \otimes \int_{t_0^{min}}^{t_0^{max}} [a(t_0) + b(t_0)\sin^2\theta]\delta\left(t - \sqrt{t_0^2 + x^2/V^2(t_0)}\right) dt_0$$

where ⊗ denotes the convolution operation. Explicitly, the convolution operation is given by $$u(t, x) = \int_{-\infty}^{\infty} dt' s(t') \quad (5)$$

$$\delta\left(t - t' - \sqrt{t_0^2 + x^2/V^2(t_0)}\right) \int_{t_0^{min}}^{t_0^{max}} dt_0 [a(t_0) + b(t_0)\sin^2\theta],$$

where t' is the variable of integration that depends on the source length. In practice the source length is a finite length time window, therefore the integration limit can be replaced by time length of the chosen source wavelet $[t_S^{min}, t_S^{max}]$. This is given by $$u(t, x) = \int_{-t_S^{min}}^{t_S^{max}} dt' s(t') \quad (6)$$

$$\delta\left(t - t' - \sqrt{t_0^2 + x^2/V^2(t_0)}\right) \int_{t_0^{min}}^{t_0^{max}} dt_0 [a(t_0) + b(t_0)\sin^2\theta].$$

Discretizing the above equation we can write the forward problem as $$u(t_l, x_j) = \quad (7)$$

$$\sum_{i=1}^{Ns} \sum_{k=1}^{Nt0} s(t_i) K\left(t_l - t_i - \sqrt{t_k^2 + x_j^2/V^2(t_k)}\right) [a(t_k) + b(t_k)\sin^2\theta] \Delta t \Delta t'$$

where K is the kernel function that is defined as an approximation to the delta function. Ns is the number of the time samples for the source function and Nt0 is the number of AVO parameters a and b. The discretized forward model computes the amplitudes at time $t_l$ and at offset $x_j$. The kernel function described by the approximate delta function can be given by a linear approximation, $$K = \frac{\Delta t - |\tau|}{\Delta t^2} \quad \text{for } |\tau| \leq \Delta t \quad (8)$$
$$= 0 \quad \text{for } |\tau| > \Delta t$$

where $\tau = t_l - t_i - \sqrt{t_k^2 + x_j^2/V^2(t_k)}$ and $\Delta t$ is the sampling interval. Denoting the kernel function by four-dimensional representation $K_{ljik}$ the forward problem can be written in a compact form. The kernel function is essentially a three-dimensional function since it is a delta function in 4-D. The compact forward model is given by $$u(t_l, x_j) = \sum_{i=1}^{Ns} \sum_{k=1}^{Nt0} K_{ljik} s_i [a_k + b_k \sin^2\theta] \Delta t \Delta t' \quad (9)$$

The sensitivity of the data with respect to the source and the AVO parameters can be obtained by simply differentiating equation (9) with respect to the parameters. This is given by $$\frac{\partial u(t_l, x_j)}{\partial s_i} = \sum_{k=1}^{Nt0} K_{ljik} [a_k + b_k \sin^2\theta] \Delta t \Delta t' \quad (10)$$

$$\frac{\partial u(t_l, x_j)}{\partial a_k} = \sum_{k=1}^{Ns} K_{ljik} s_i \Delta t \Delta t'$$

$$\frac{\partial u(t_l, x_j)}{\partial b_k} = \sum_{k=1}^{Ns} K_{ljik} s_i \sin^2\theta \Delta t \Delta t'$$

The sensitivity equation in equation (10) shows very similar computational features to the forward model in equation (9). This makes the algorithm very fast, since the kernel function is the same in the forward problem as well in the sensitivity problem. This is because the forward problem is a bilinear problem, not strictly a nonlinear problem. Therefore, once the kernel functions are computed, both the forward model responses and sensitivity can be obtained easily. This is another attractive feature of this formulation.

In this section, time domain inversion for source and AVO parameters is illustrated. The goal of the inverse problem is to obtain the source parameters and AVO parameters from the multi-offset data. If there are more model parameters than data, the problem becomes under-determined. Although in practice we can pose the problem with fewer model parameters, the problem can still be considered to be essentially underdetermined due to the system being ill-posed (leading to rank deficiency). To overcome non-uniqueness we minimize a particular norm of the model parameters based on physical intuition subject to fitting the data. For example, the source function has smooth properties although it is limited in time, whereas the AVO parameters a and b can be spiky in nature, indicating that they are discontinuous as a function of $t_0$. Thus a possible choice of model norms is given by combination of an L2-Norm in which we minimize the difference of the source wavelet with a reference wavelet or a priori wavelet and an L1-Norm to obtain a 'spiky' solution for the AVO parameters that allows preservation of the discontinuities in intercept and gradient. The inverse problem to determine the source function and the AVO parameters in time domain can be stated as, $$\min \phi_m = \alpha_s \int (S(t) - S^0(t))^2 dt + \alpha_n \int |a - a^0| dt_0 + \alpha_b \int |b - b^0| dt_0$$

$$\text{subject to } \phi_d = \|W_d(d^{obs} - F(a,b,S))\|^2 = \phi_d^*$$

$$\text{subject to } a^{min} \leq a \leq a^{max}$$

$$\text{subject to } b^{min} \leq b \leq b^{max} \quad (11)$$

where,
 (i) $\phi_m$ is called the model objective function.
 (ii) $\phi_d$ is the data misfit function. This is a L2-Norm of the data residual.
 (iii) F(a,b,S) is the forward modeling operator to generate the predicted data.
 (iv) $a = a(t_0)$ and $b = b(t_0)$ are the intercept and gradient parameter function.
 (v) $a^{min}$, $a^{max}$, $b^{min}$, $b_{max}$ are the lower and upper bounds on the AVO parameters.
 (vi) S(t) is the source function to be obtained from inversion.

(vii) $S^0(t)$ is the reference model for source function. This can be any a priori model, including a null set.

(viii) $d^{obs}$ is a vector containing the data.

(ix) $\phi_d^*$ is the final data misfit that we want to achieve after the inversion. For example if the data are contaminated by Gaussian random noise having a normal distribution of zero mean and unit standard deviation then $\phi_d^*$ is a chi-square variable with expectation equal to number of data $E(\phi_d)=N$ and variance equal to twice the number of data $Var(\phi_d)=2N$. Thus given this noise assumption our stopping criteria for the misfit will be equal to $N \pm \sqrt{2N}$.

(x) $W_d$ is a data weighting matrix. It is essentially a diagonal matrix whose elements are the reciprocal of the standard deviation for each datum.

If we discretize the integrals then the inverse problem can be written as, $$\min \phi_m = \alpha_s \|W_s(s-s_0)\|^2 + \alpha_a \|W_a R_a(a-a_0)\|^2 + \alpha_b \|W_b R_b (b-b_0)\|^2$$

subject to $\phi_d = \|W_d(d^{obs}-F(a,b,S))\|^2 = \phi_d^*$ subject to $a^{min} \leq a \leq a^{max}$ subject to $b^{min} \leq b \leq b^{max}$ (12)

where, (i) $W_s$ is a weighting matrix of size M×M where M is the length of the vector that it is pre-multiplying. Most often it is an identity matrix.

(ii) $W_a, W_b$ are the weighting matrices for a and b parameters which are also identity matrices in most cases. The matrices $R_a, R_b$ transform the L1-Norm into a pseudo-L2-Norm form using IRLS procedure.

The transformation of the above inverse problem to an optimization problem can be written as, $$\min \phi = \beta[\alpha_s \|W_s(s-s_0)\|^2 + \alpha_a \|W_a R_a(a-a_0)\|^2 + \alpha_b \|W_b R_b(b-b_0)\|^2] + \left\| \delta d - [G_s G_a G_b]\begin{bmatrix}\delta s \\ \delta a \\ \delta b\end{bmatrix}\right\|^2 - 2\lambda_a \sum_{k=1}^{Nt0}\left[\ln\left(\frac{a_k - a_k^{min}}{a_k^{max}}\right) + \ln\left(1 - \frac{a_k}{a_k^{max}}\right)\right] - 2\lambda_b \sum_{k=1}^{Nt0}\left[\ln\left(\frac{b_k - b_k^{min}}{b_k^{max}}\right) + \ln\left(1 - \frac{b_k}{b_k^{max}}\right)\right]$$ (13)

where $\alpha_s, \alpha_a, \alpha_b$ are the control parameters (scalar) that control the relative contribution of the source, intercept and gradient norms. $G_s, G_a, G_b$ are the sensitivity matrices for source, a and b parameters respectively. $\delta d = d^{obs} - F(s,a,b)$ is the data residual at a particular iteration and $\delta s, \delta a, \delta b$ are the model perturbation vector for source, a and b parameters. $\lambda_a, \lambda_b$ are the barrier parameters for the a and b parameters. $R_a, R_b$ are diagonal matrices that depend on a and b and essentially convert the L1-Norm to an equivalent L2-Norm solution using the IRLS procedure. Minimization of the objective function in equation (13) leads to a system of equations to be solved for model perturbations. This is given by $$\begin{bmatrix} G_s & G_a & G_b \\ \sqrt{\beta\alpha_s}W_s & 0 & 0 \\ 0 & \sqrt{\beta\alpha_a}W_a R_a & 0 \\ 0 & 0 & \sqrt{\beta\alpha_b}W_b R_b \\ 0 & \sqrt{\lambda_a}X_a & 0 \\ 0 & \sqrt{\lambda_b}X_b & 0 \\ 0 & 0 & \sqrt{\lambda_a}Y_a \\ 0 & 0 & \sqrt{\lambda_b}Y_b \end{bmatrix} \begin{bmatrix}\delta s \\ \delta a \\ \delta b\end{bmatrix} = \begin{bmatrix} \delta d \\ -\sqrt{\beta\alpha_s}W_s(s-s_0) \\ -\sqrt{\beta\alpha_a}W_a R_a(a-a_0) \\ -\sqrt{\beta\alpha_b}W_b R_b(b-b_0) \\ \sqrt{\lambda_a}M_a\vec{e} \\ -\sqrt{\lambda_a}M_a\vec{e} \\ \sqrt{\lambda_b}M_b\vec{e} \\ -\sqrt{\lambda_b}M_b\vec{e} \end{bmatrix}$$ (14)

The above system of equations is solved using a CGLS procedure to model the model perturbation. Note that the matrix in equation (14) is sparse except in the sensitivities for the AVO parameters. The optimization problem is then iteratively solved by updating the model at each iteration subject to a line search procedure such that the objective function in equation (13) decreases in consecutive iterations. The algorithm terminates at convergence i.e. when the data misfit is satisfied or when the objective function reaches a plateau.

Figure 2D:
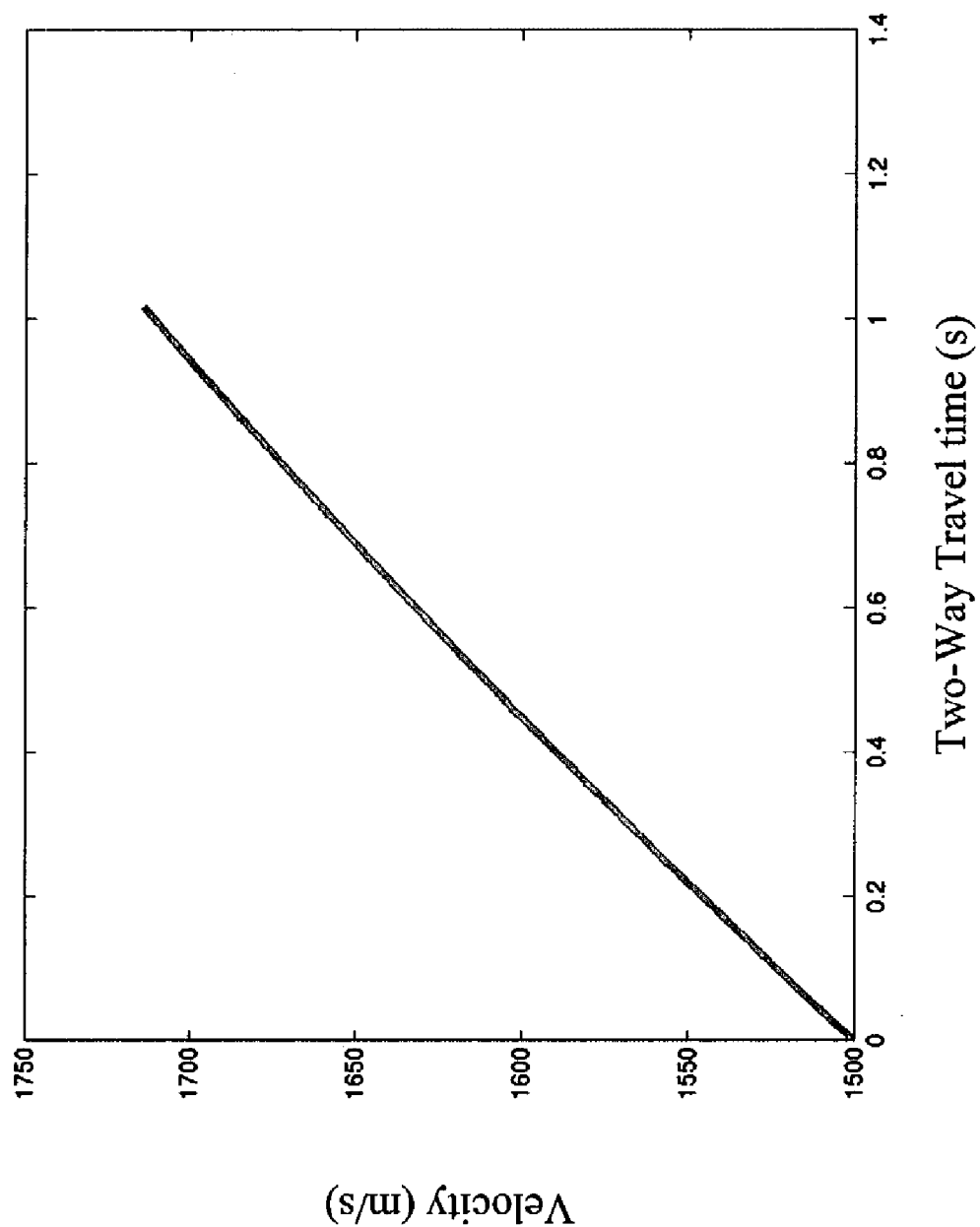
FIG. 2(d) illustrates the NMO velocity model as a function of zero-offset travel time used to generate the synthetic seismic data gather in FIG. 3.

This section presents a synthetic example in the time domain to illustrate the inversion method. FIG. 2 illustrates the true model parameters used to generate the synthetic data. The source wavelet illustrated in FIG. 2(a) is a Ricker wavelet with a dominant frequency of 30 Hz. The wavelet is not centered in time around zero, but is shifted. The time shift produces a linear phase spectrum for the wavelet. The sampling interval of the wavelet and data is 8 ms and the wavelet is 240 ms long. The intercept and gradient parameters are shown in FIG. 2(b) and FIG. 2(c) respectively. The sparse spike intercepts and gradients are generated by taking odd powers of random number series with sampling interval of 8 ms. There are total 128 intercept and gradient values in the time window of [0,1.016] seconds. The velocity function presented in FIG. 2(d) is the normal moveout velocity function used to apply hyperbolic moveout. The velocity is a smooth function that increases with two-way zero offset time as is typically encountered in real data situations.

Figure 3:
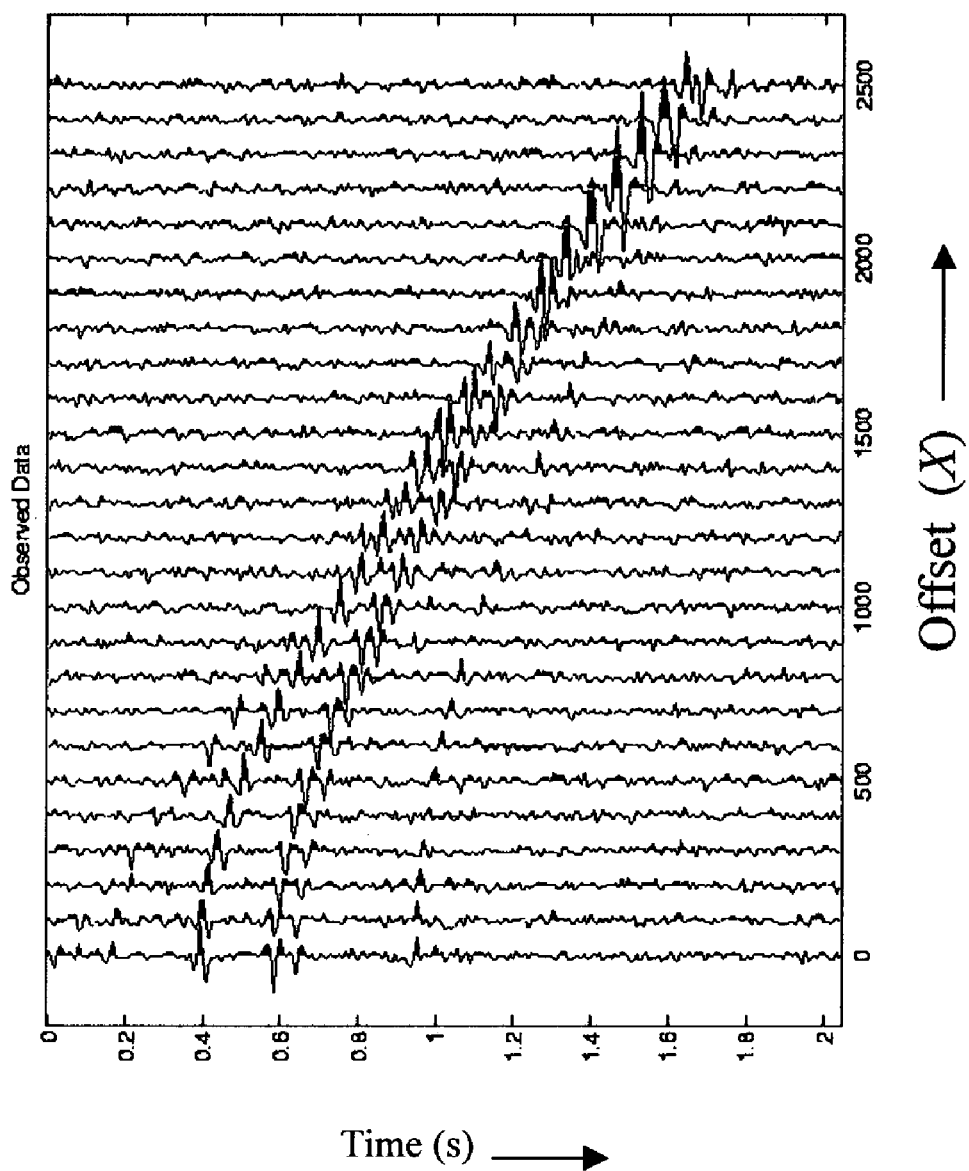
FIG. 3 illustrates a synthetic seismic data gather generated with the wavelet and intercept and gradient parameters illustrated in FIGS. 2(a), 2(b) and 2(c)

The synthetic data are illustrated in FIG. 3. These data are generated with the source wavelet of FIG. 2(a), the AVO parameters illustrated in FIG. 2(b)–2(c) and the velocity model in FIG. 2(d). The FIG. 3 data are contaminated with Gaussian random noise with a standard deviation of 2% of the maximum amplitude of the data shown in FIG. 3. Data presented in FIG. 3 have 26 offsets from 0–2500 m with 100 m intervals. The total trace length is 2.04 s resulting in 6656 data total samples. The input to the inversion is the noisy data, velocity function, starting model, reference model, and estimates of data error and bounds on the AVO parameters. The starting model and the reference model for the inversion are both taken to be a constant close to zero. Choosing the reference model close to zero implies that there is no a priori information available about the model. The lower and upper bounds for the intercept and gradient parameters are chosen to be [−0.6, 0.6].

Figure 6:
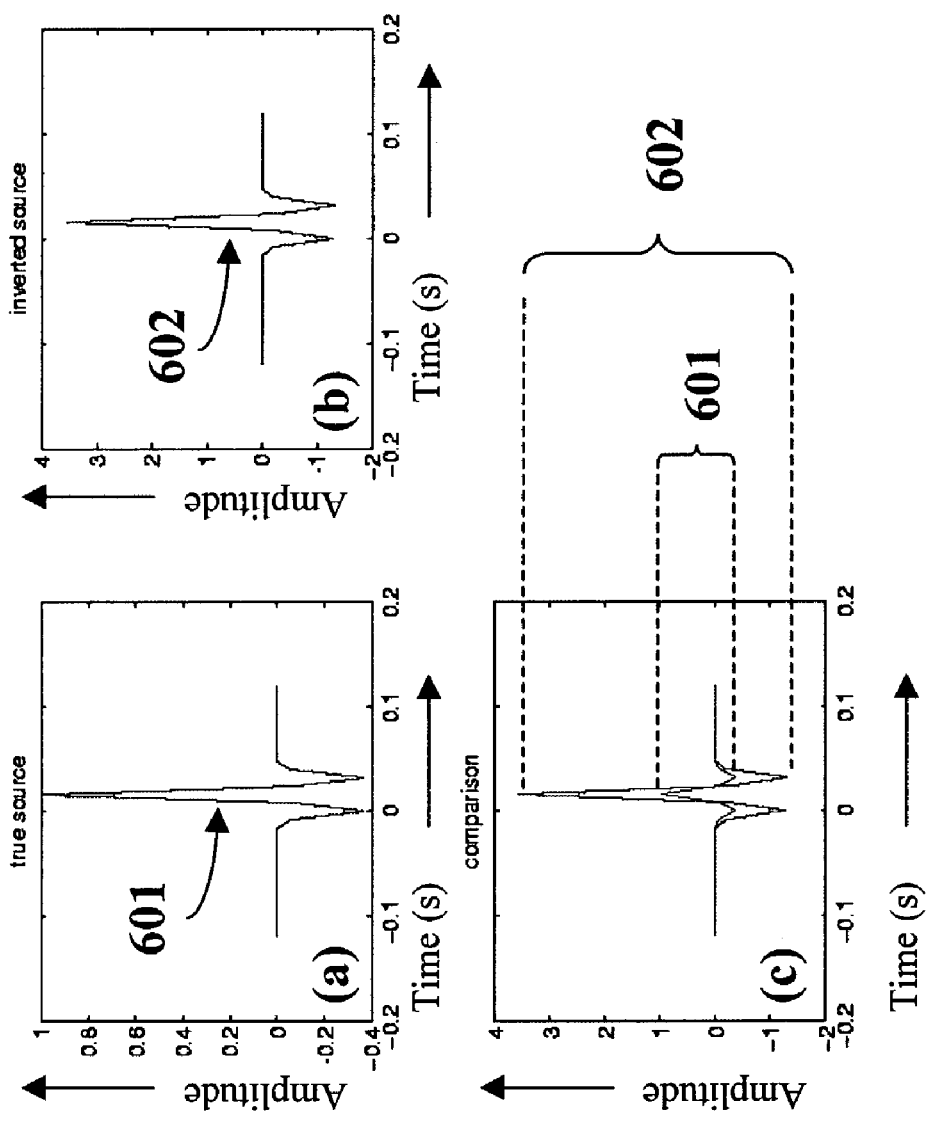
FIG. 6(a) illustrates the true source wavelet.
FIG. 6(b) illustrates the inverted source wavelet.
FIG. 6(c) illustrates that the true source wavelet and the inverted source wavelet match well except for a scale factor.
Figure 7:
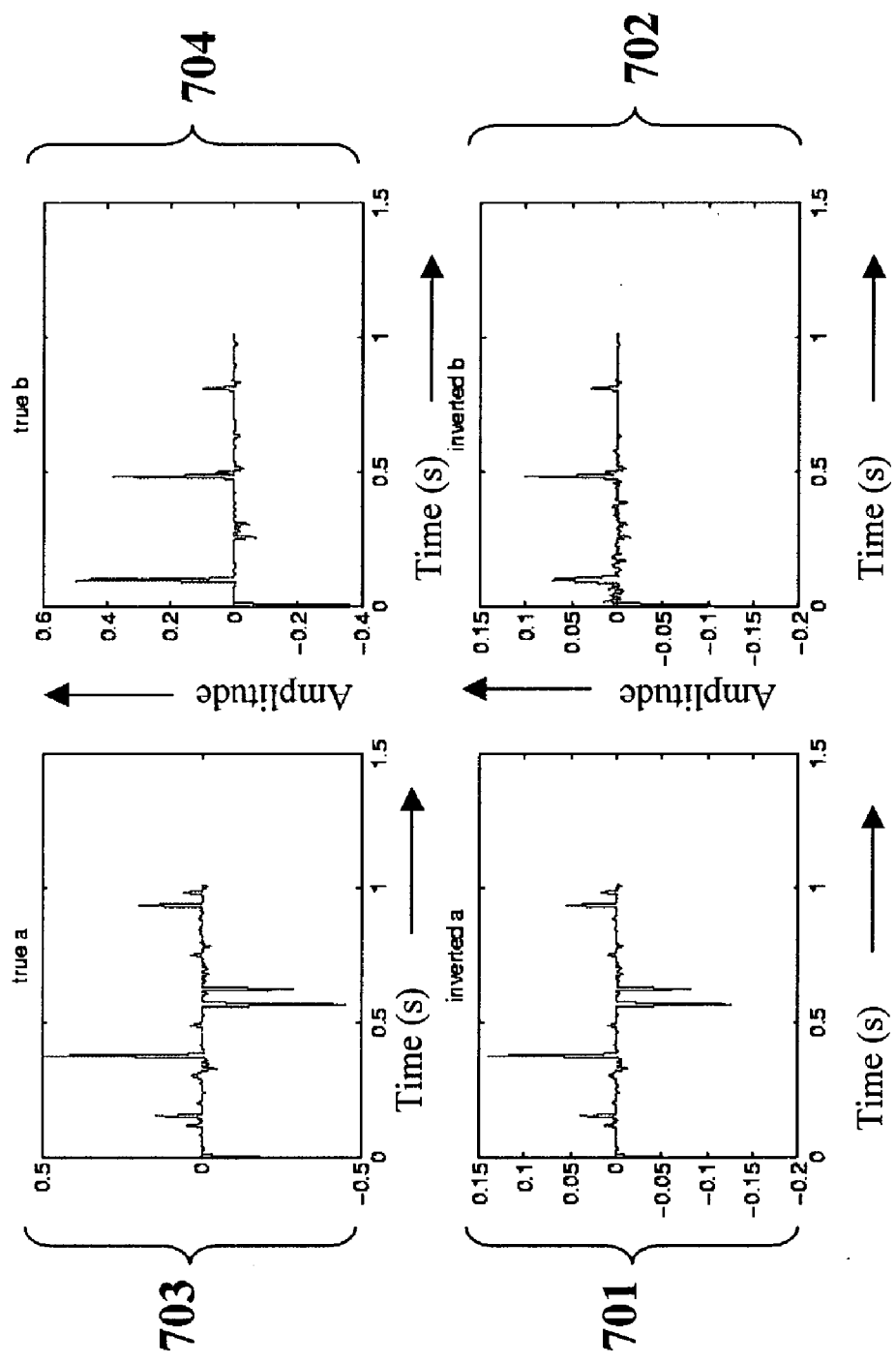
FIG. 7 illustrates the comparison between the true model AVO parameters and the inverted model AVO parameters.

The inversion converges in 6 iterations and the resulting model for source and AVO parameters are illustrated in FIG. 6 and FIG. 7 respectively. FIG. 6, the comparison between the true source wavelet 601 and the inverted wavelet 602, illustrates the recovered source wavelet 602 is a good match to the true model 601. The wavelet is a Ricker wavelet with a peak frequency of 30 Hz and is shifted two samples (16 ms) from zero time. This source wavelet is 31 samples long, from −0.12 s to 0.12 s (240 ms total).

The model 601 and inverted source 602 wavelet match except for differing by a constant scale factor. The scale factor between the true source and the inverted source arises due to the inherent non-uniqueness in the convolution model. If we multiply the source by a constant factor and divide the AVO parameters by the same factor it will generate the same responses. However this is not a very serious limitation since seismic data in general have arbitrary units. Other than the scale factor, the timing of the peaks and troughs of the inverted wavelet have excellent match with the true source wavelet. This shows that the present invention has the ability to recover a non-zero phase wavelet. This is an important advantage in wavelet estimation since, in prior art methods, phase is an ill-determined quantity. The present invention provides for recovery of non-zero phase and non-stationary phase wavelets.

The inverted AVO parameters are illustrated in FIG. 7 and indicate that both intercept 701 and the gradient parameters 702 presented in the bottom panel show good match with the true model parameters for intercept 703 and gradient 704 presented in the upper panels. There is a scale difference between the recovered amplitude and the true amplitude. The recovered amplitudes are smaller than true amplitudes, since it is compensated by a higher amplitude recovered source wavelet compared to the true wavelet in FIG. 6. Careful examination of FIG. 7 shows that the recovered intercept parameters are better resolved than gradient parameters. This is because the sensitivity of the gradient parameters is weaker compared to the intercept parameters implying that the data constrains the intercept better than the gradients. At smaller offsets the sensitivity of gradient parameters are weaker compared to larger offsets. This implies that L1-Norm for the gradient parameters will play a greater role than for the intercepts. As a result one would expect that gradient section be sparse spike compared to intercept section. This is not clearly illustrated in this example because the original intercept parameters are also sparse spike. However, the inversion algorithm was able to recover all of the dominant gradient spikes. The reduced amplitude of one of the spikes in the lower time section is probably due to edge effects of the wavelet in FIG. 7.

Figure 4:
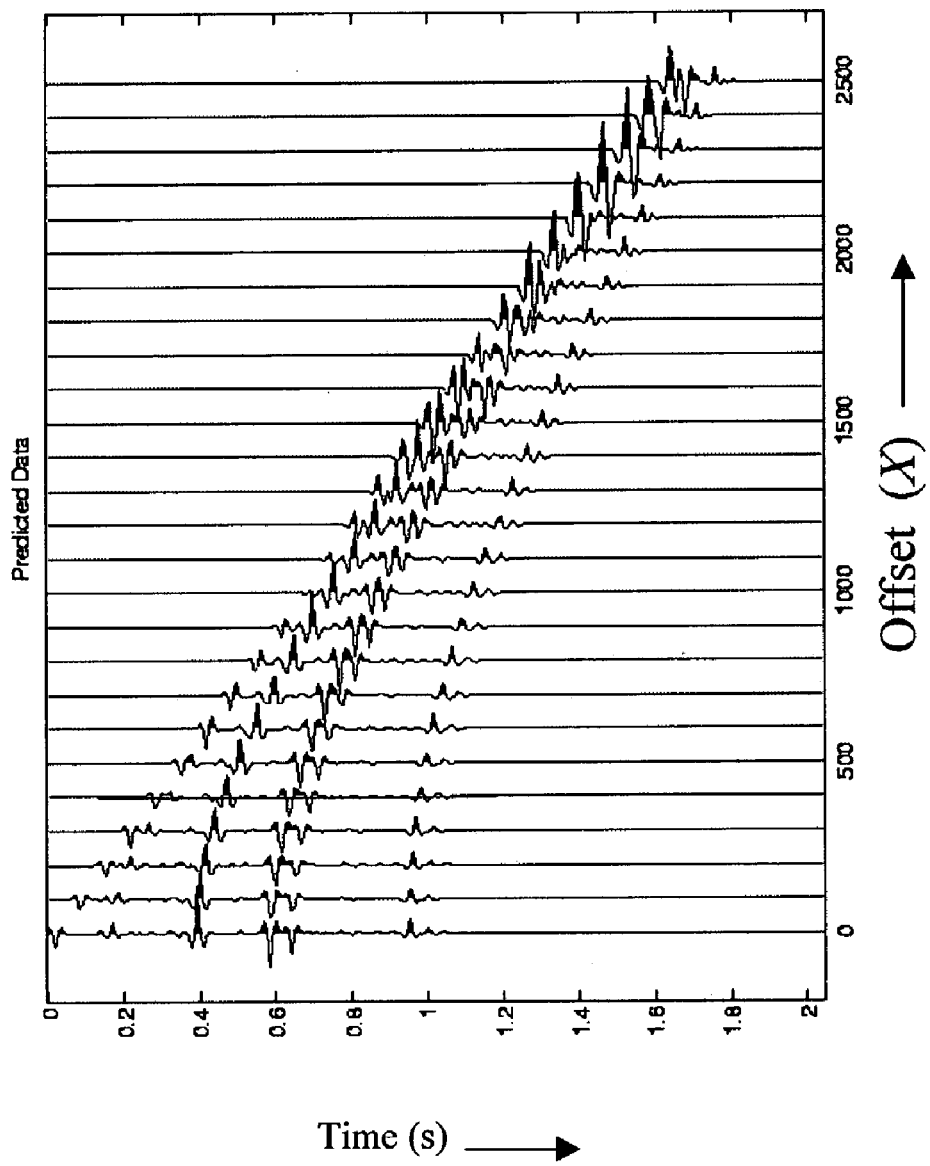
FIG. 4 illustrates the data as determined from the inversion.
Figure 5:
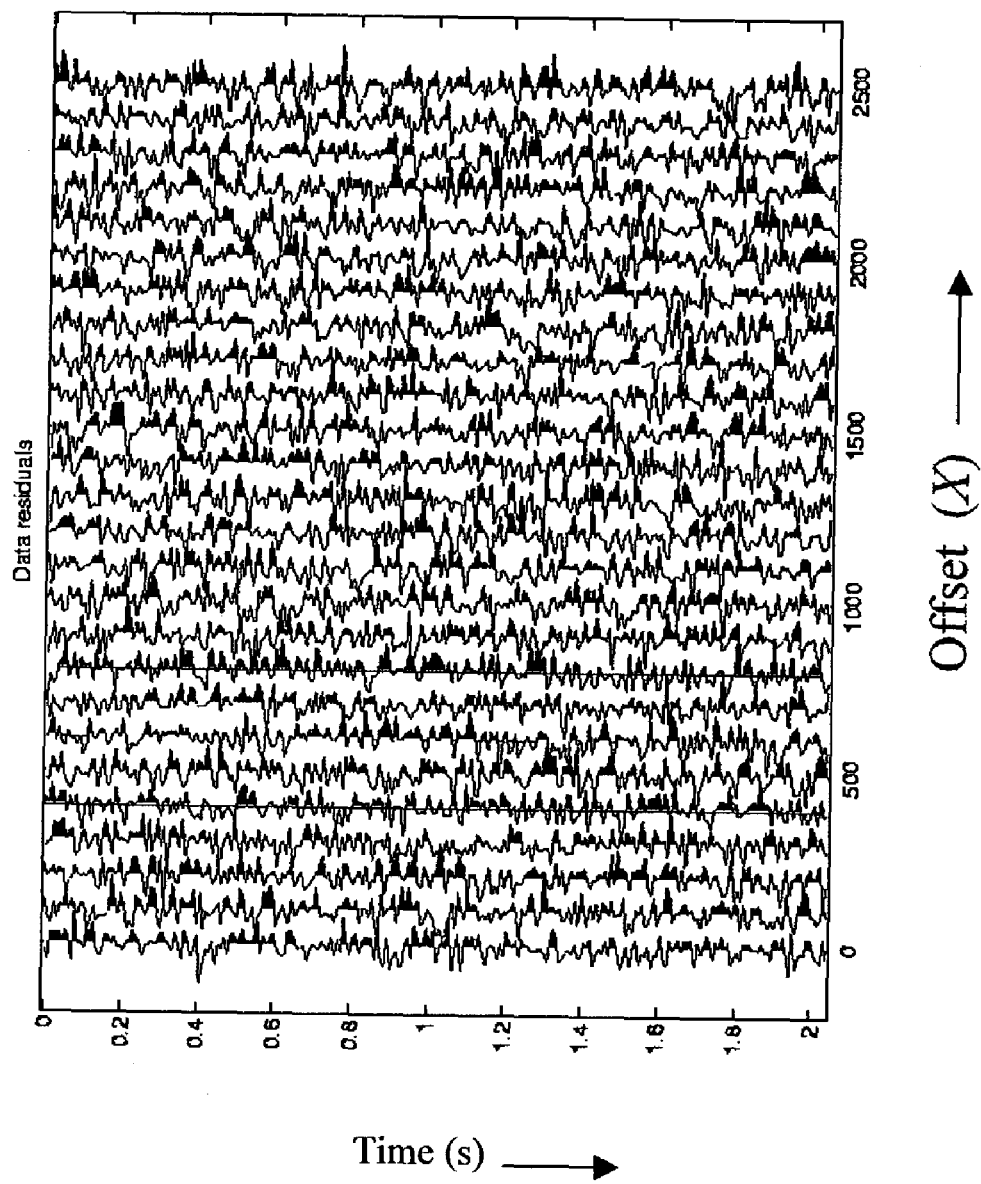
FIG. 5 illustrates the data residual after determined data is subtracted from the synthetic seismic data gather of FIG. 3.

FIG. 4 illustrates the data predicted from the inversion. The predicted data that is illustrated in FIG. 4 shows that the inversion has essentially recovered the signal. Only signal is predicted from the inversion, not the noise. This is because the noise does not follow the hyperbolic moveout equation. FIG. 5 illustrates the residual, that is, the difference between the noisy data of FIG. 3 to be inverted and the predicted data from the inversion of FIG. 4. FIG. 5 illustrates that the residual noise is random in nature without any coherent signal. The scale of this FIG. 5 is amplified for clarity to identify any coherent signal. The presence of coherent signal would signify that the data have been underfitted. It is apparent from examination of FIG. 5 that data have been adequately fit within the noise level.

Figure 8:
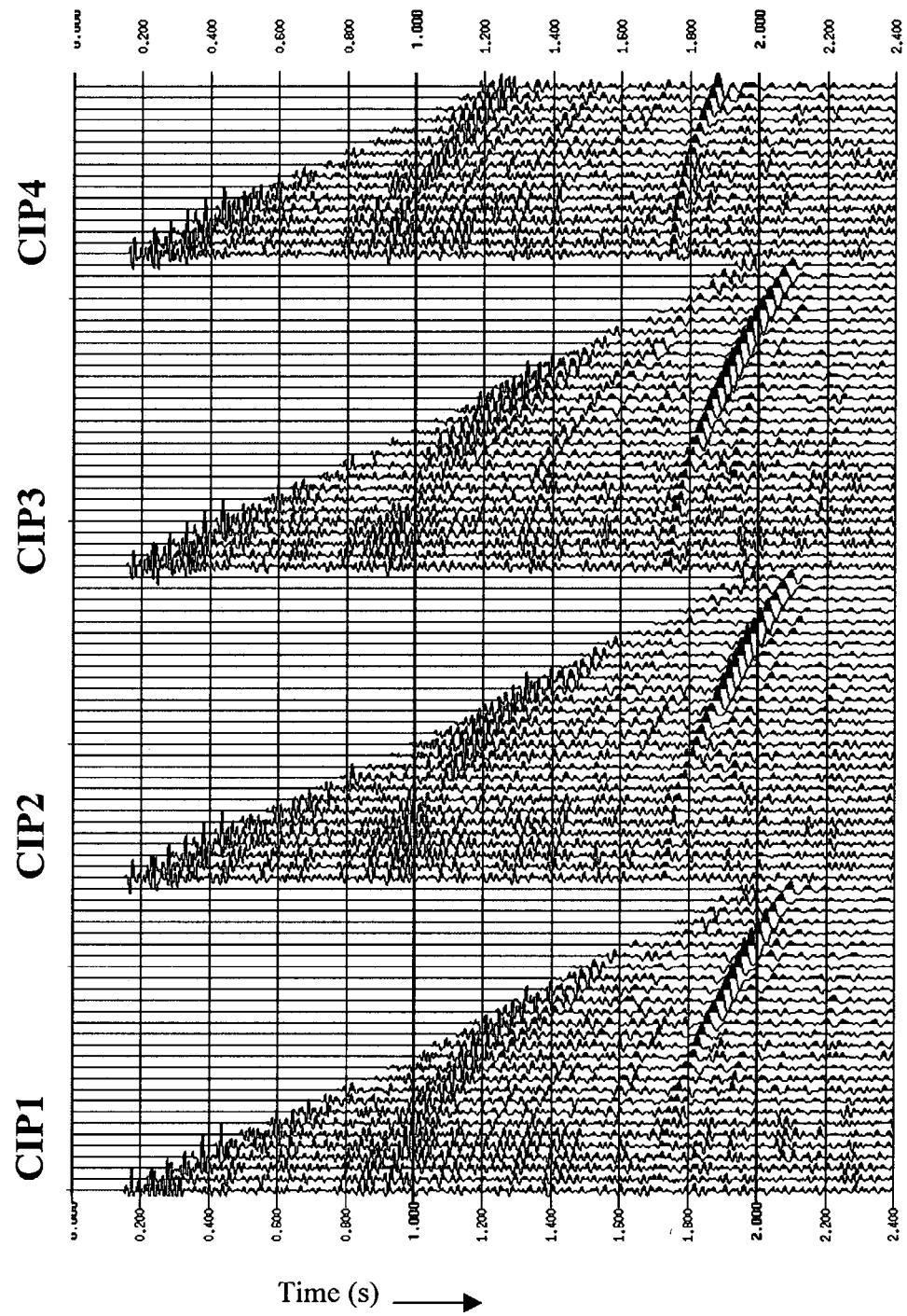
FIG. 8 illustrates seismic CDP gathers.

In this section we present an example of applying the time-domain inversion method of the present invention to a data set from Indonesia. In order to apply the inversion method, the data were pre-processed to make it compatible with our forward modeling that handles primaries only data. The data had significant anisotropic effects at larger offsets. It was first depth migrated using an anisotropic velocity model (Meek et al., 2002) and then the data were stretched to time using a vertical velocity function. This produced common image gathers that are pseudo-isotropic. This is an important step since our forward modeling is carried out using an isotropic velocity model. Next, velocity analysis was carried out on these pseudo-isotropic gathers to determine the NMO velocity function as a function of zero-offset time that effectively flattened the reflectors. An important requirement of this inversion is good estimates for NMO velocity functions, since the reflectivities are essentially perturbations of the actual velocity model. Therefore, velocity analysis needs to be carried out carefully for application of the inversion. Representative CIP gathers, arbitrarily labeled, from a cross-line of the data set are shown in FIG. 8. There are 28 offset traces in each CIP gather with the offset range from 225–3000 m. The time window of interest is from 0.4 seconds to 1.7 seconds, i.e. $t_0^{min}=0.4$, $t_0^{max}=1.7$.

Figure 9:
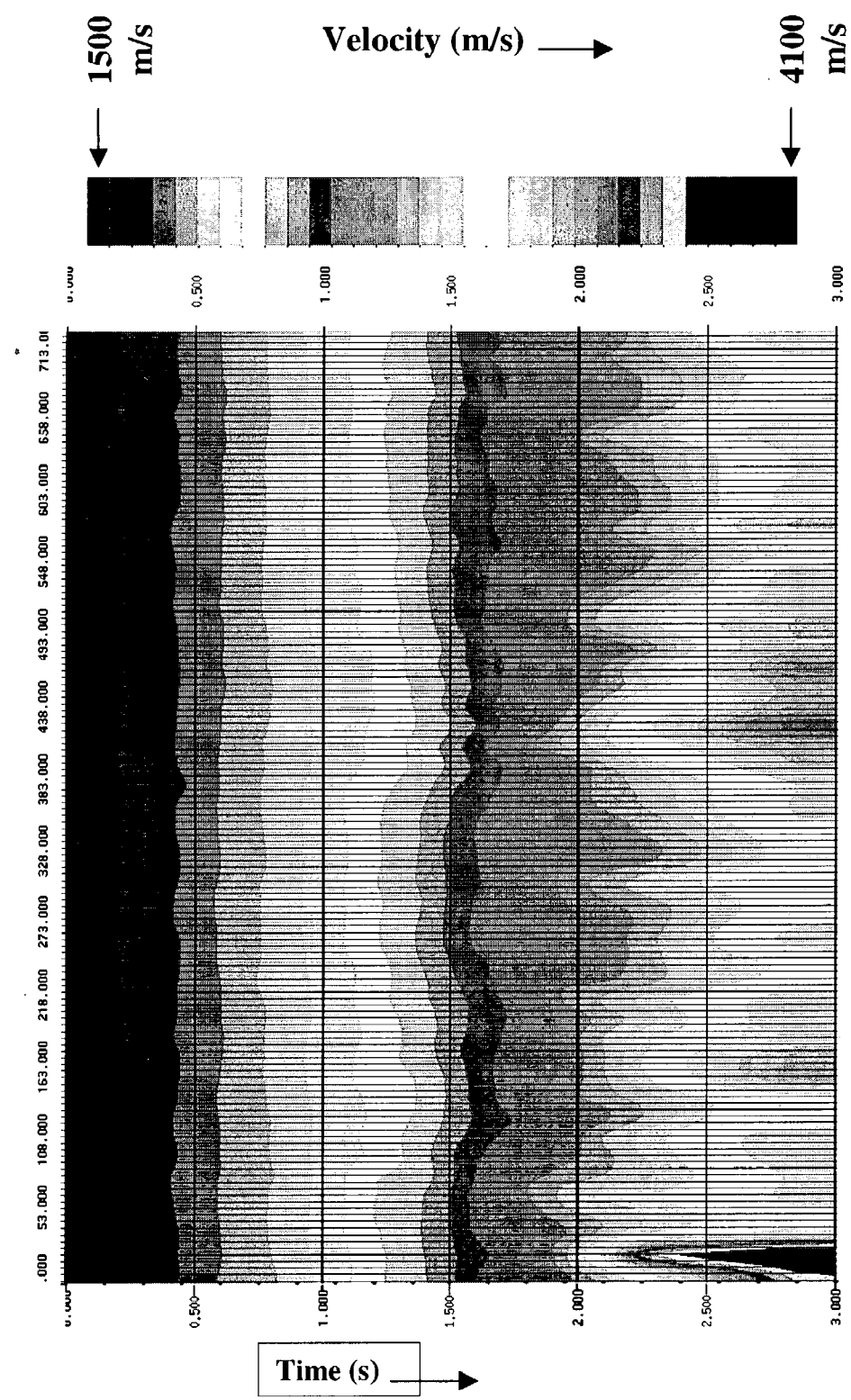
FIG. 9 illustrates a NMO velocity model.
Figure 10:
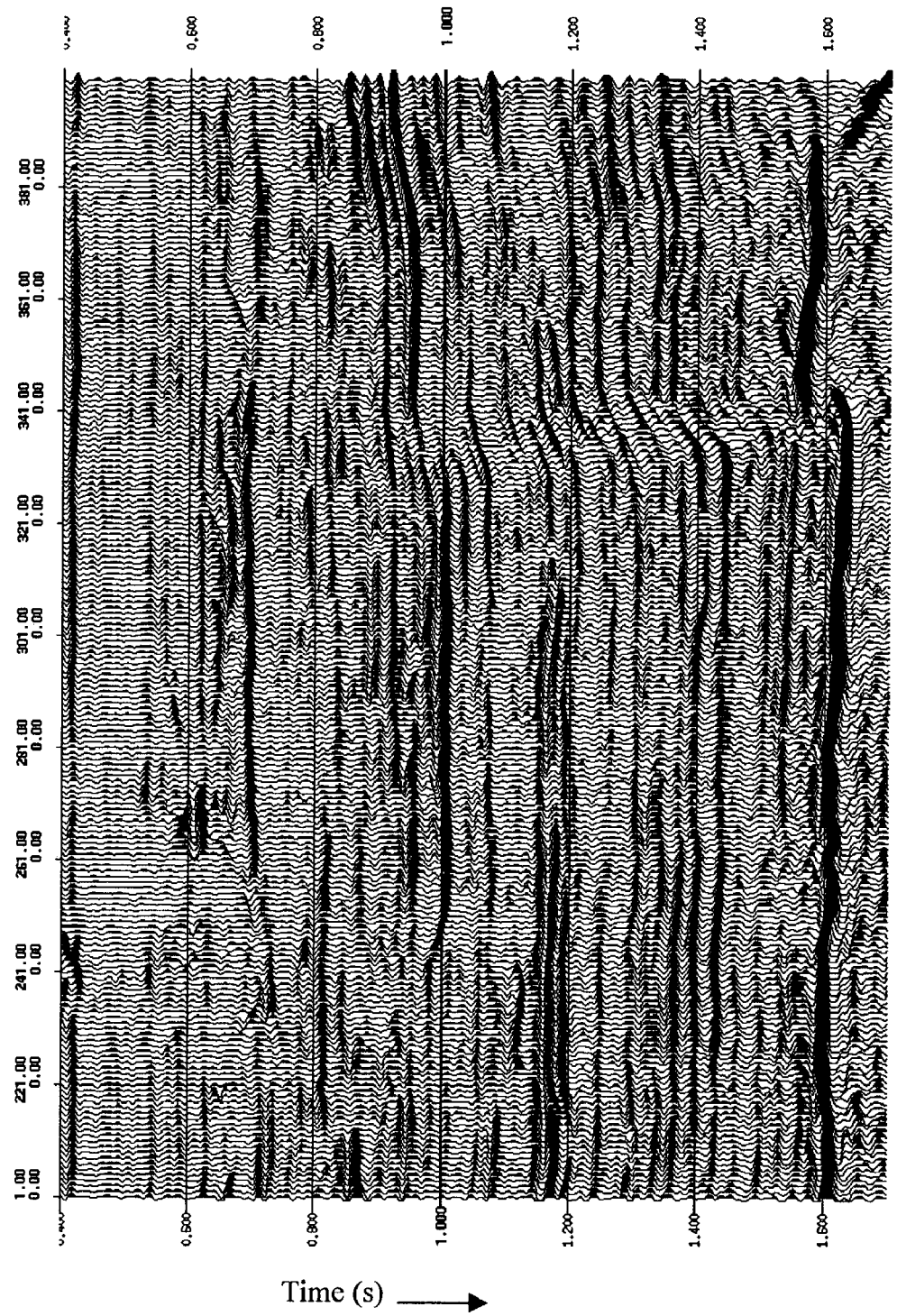
FIG. 10 illustrates a stacked section of seismic data.
Figure 11:
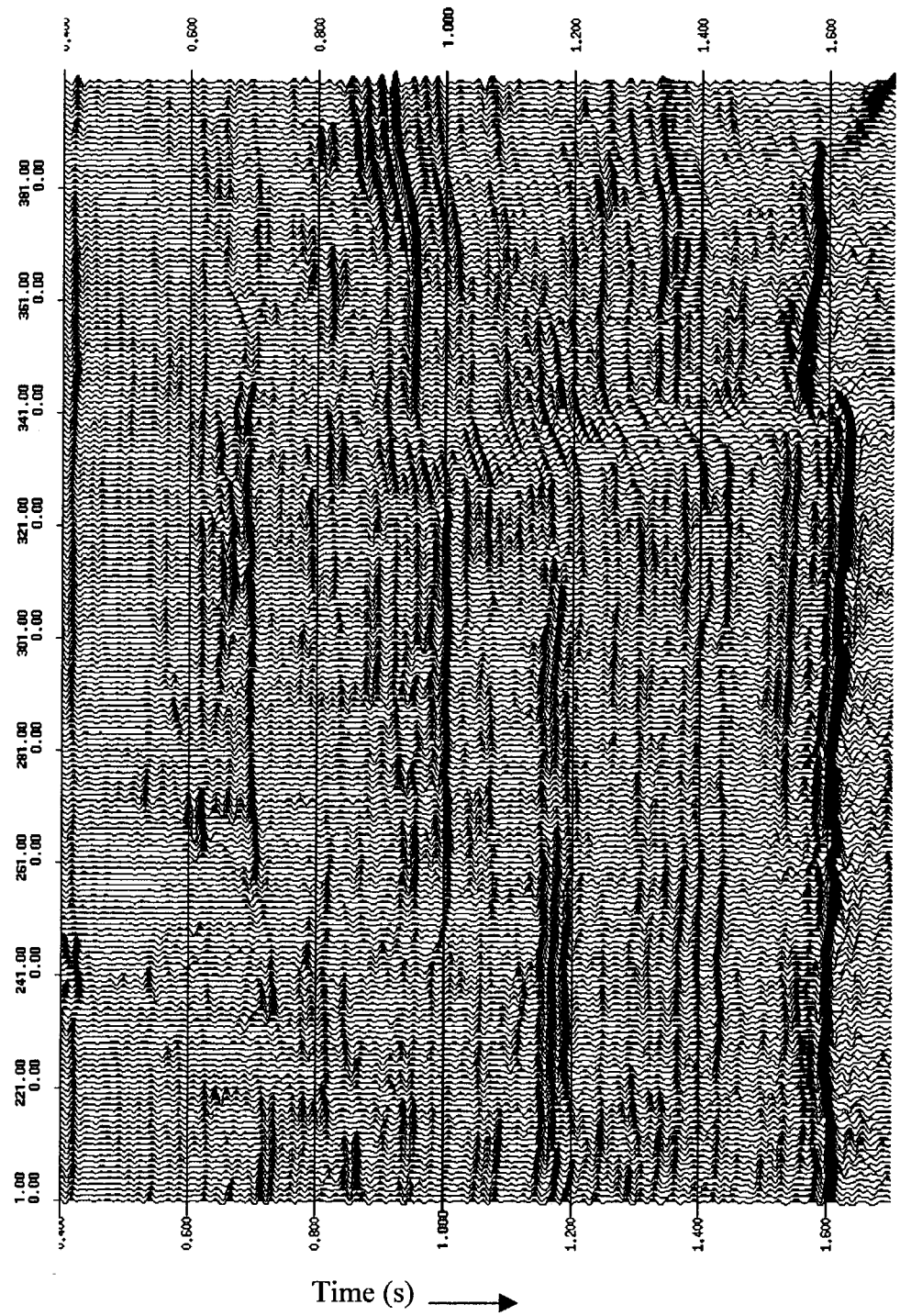
FIG. 11 illustrates the stack section of FIG. 10 after signature deconvolution.
Figure 12:
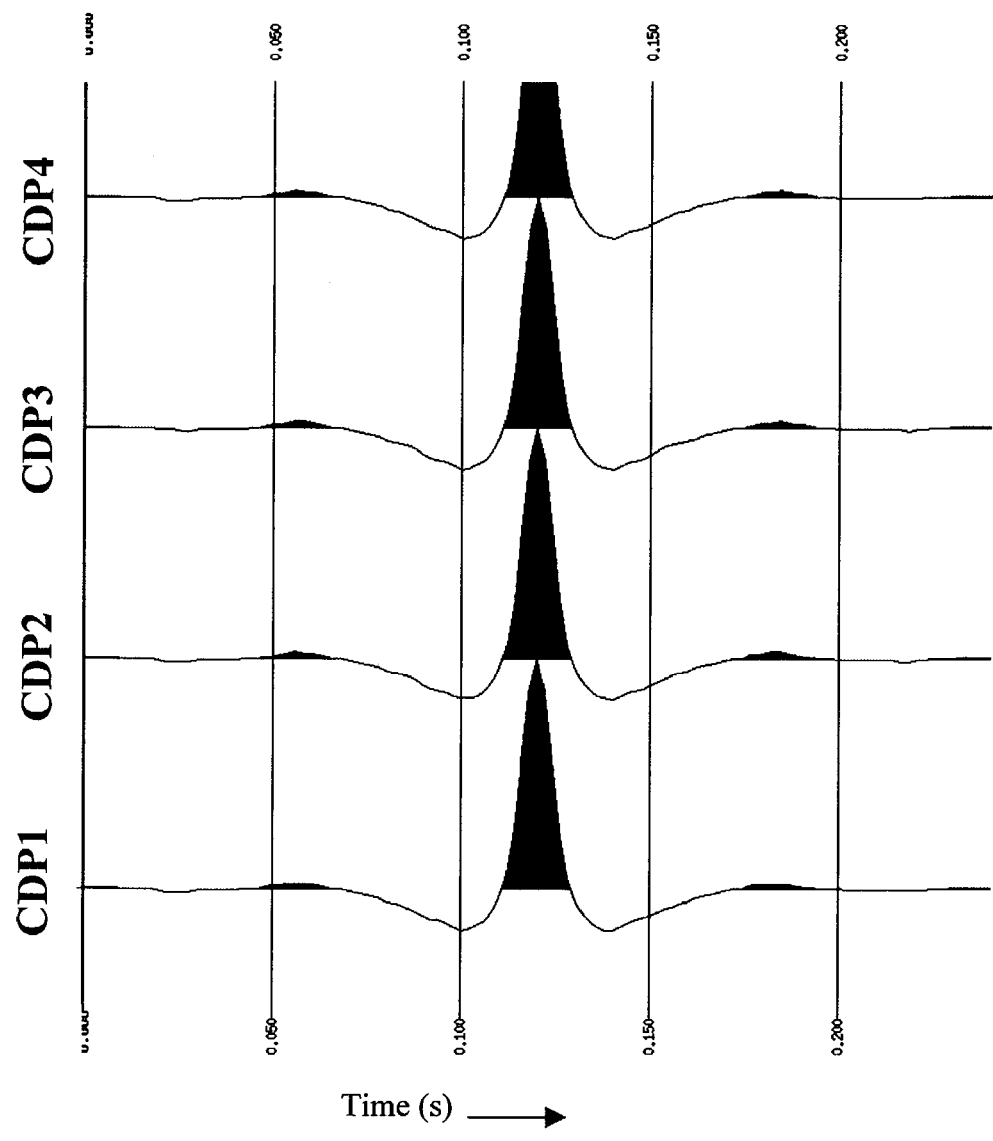
FIG. 12 illustrates inverted source wavelets from acquired seismic data.

FIG. 9 shows the NMO velocity model obtained from velocity analysis. This model is built by carrying out the velocity analysis and subsequently correcting for residual moveouts as necessary. This velocity model is used in the inversion and in generating the example stack section shown in FIG. 10. The bright reflector at 1.6s in the stack section is interpreted to be the basement. In order to have a fair comparison of the stack section with the nonlinear inversion results, the effect of the wavelet needs to be removed from the stack section. This is essentially signature deconvolution, as is well known to those versed in the art. The wavelets obtained from the nonlinear inversion at each CDP (example wavelets for CDPs are illustrated in FIG. 12) are used to deconvolve the source effects from the stack traces presented in FIG. 11. We note that FIG. 11 is a sharper image than FIG. 10, as expected, since the source wavelet effects are removed.

Real data cases may have complications not present with synthetic data examples. Some important aspects of real data that must be considered are different kinds of noise that are not compatible with the forward modeling, incomplete data due to muting or dead traces, errors in velocity function picks, arbitrary scales in seismic data that have no physical relation to intercept and gradient parameters and wave propagation effects on the source wavelets. This is not a comprehensive list of problems, but it indicates that practical implementation with real data sets requires attention to detail. For example, the choice of time domain to implement the algorithm arises from inadequacies of real data. Traces in real data sets are most often muted and the mute function can vary with offset. This makes the implementation difficult in the frequency domain since we need to convolve a window with the trace to mask the missing portion of the data. This complication can be avoided by working directly with data in the time domain and discarding/ignoring the data values that are in the muted portion of the trace. Some aspects of practical implementation of the method of the present invention are:

a. Data extraction using hyperbolic window: The forward modeling in equation (6) indicates that for each $t_0$ position there is a single hyperbolic moveout curve. This implies that if we chose a certain time window on the CDP section then the portion of the data that are sensitive to the model parameters within the window is hyperbolic in nature. This hyperbolic window can be computed using the velocity value at the corresponding zero-offset time. The hyperbolic trajectory for a particular $t_0$ value is given by $t(x)=\sqrt{t_0^2+x^2/V^2(t_0)}$. Therefore data within these two hyperbolic trajectories will be informative of the AVO parameters in the chosen window. In addition for each trace the final data samples will be those that are within this window and beyond the mute region. This practical choice of hyperbolic window is useful to reduce the number of data in the inversion problem and thus increases the computational speed of the algorithm.

b. Data normalization: In real data sets the amplitude information is relative. This is because the seismic data has arbitrary units. Since large and small numbers can affect the numerical precision of the computation it is wise to normalize the data prior to inversion. This is carried out by normalizing by the RMS value of the data in the hyperbolic window. This normalization has some practical implication since the reflectivity function is bounded within [−1,1], so the RMS energy can be attributed to a greater extent to the source function.

c. Scaling of the source and AVO model norm: In the inversion section we outlined that the model objective function is a combination of L2-Norm for source and L1-Norm for intercept and gradient given by $$\alpha_s \int (S(t)-S^0(t))^2 dt + \alpha_a \int |a-a^0| dt_0 + \alpha_b \int |b-b^0| dt_0$$

In order for the norms to take effect in the inversion, it is important to decide their relative contribution, i.e. what would be an appropriate choice for the control parameters denoted by $\alpha_s, \alpha_a, \alpha_b$. We know that the AVO parameters are within range of [−1,1], and the source function has the energy close to that of the data. With this assumption we take the value of $\alpha_s = d_{RMS}^2$, $\alpha_a = 1, \alpha_b = 1$. This choice seems to provide us with results that are physically meaningful and derivable from the data.

d. Choosing an appropriate noise statistic: Although we process the data to make it compatible with the forward model, there are still other sources of noise that cannot be explained by hyperbolic moveout equation, like residual multiples or absorption to name a few. Also we need to make some assumption about the noise in the data prior to the inversion. In most data sets, it is a general observation that the noise content varies from one CDP to the other. This implies that we need to choose a robust measure of standard deviation that is fairly consistent from one CDP to the next. With this hindsight it is appropriate to choose a standard deviation based on a median value of the data in the gather. The median amplitude value seems to be a robust parameter compared to maximum amplitude of the data in a prestack gather. In other words the variation of the median value is less compared to maximum value from one CDP to the next. For example in some CDP's where the residual multiples have high amplitudes at near offset traces, choosing a maximum amplitude based standard deviation will more likely be affected by the multiples than if a median estimate is chosen. Based on this observation, a preferred embodiment of the present invention uses a percentage of the median value of the gather as the standard deviation.

e. Choice of reference model: One of the important aspects of this inversion algorithm is the ability to incorporate a priori information in the algorithm. If we have no knowledge about the model then it is recommended to take them equal to zero. However in practice we may have some knowledge about the model parameters from other processing or well log information. For example, an estimate of the source wavelet from other wavelet estimation methods can be included as a reference model in the inversion. In that case the inversion will produce a source wavelet that is close to the reference model in a L2 sense. In other words there can be a bias of the recovered wavelet to the reference wavelet and the difference between the two is then what is required to fit the data. Similarly if we have estimates for the AVO parameters from well logs, such that the depth information of intercept and gradient parameter from well logs can be stretched to zero-offset time then it can be included as a reference model. In most cases this information is not easily available, so reference models are most likely chosen to be zero.

f. Convergence Criteria: We assume that the noise is Gaussian random noise with normal distribution having zero mean and standard deviation equal to the percentage of median value. Thus the data misfit is a chi-square variable and the expected value is equal to number of data, N, and variance is equal to 2N. Thus the convergence criteria are when the data misfit is within $N \pm \sqrt{2N}$. In addition we introduce an asymptotic convergence criterion; if the misfit between consecutive iterations does not decrease by 2% then the convergence is forced. This prevents over fitting the data when the hyperbolic moveout equation can no longer explain the data.

Figure 13:
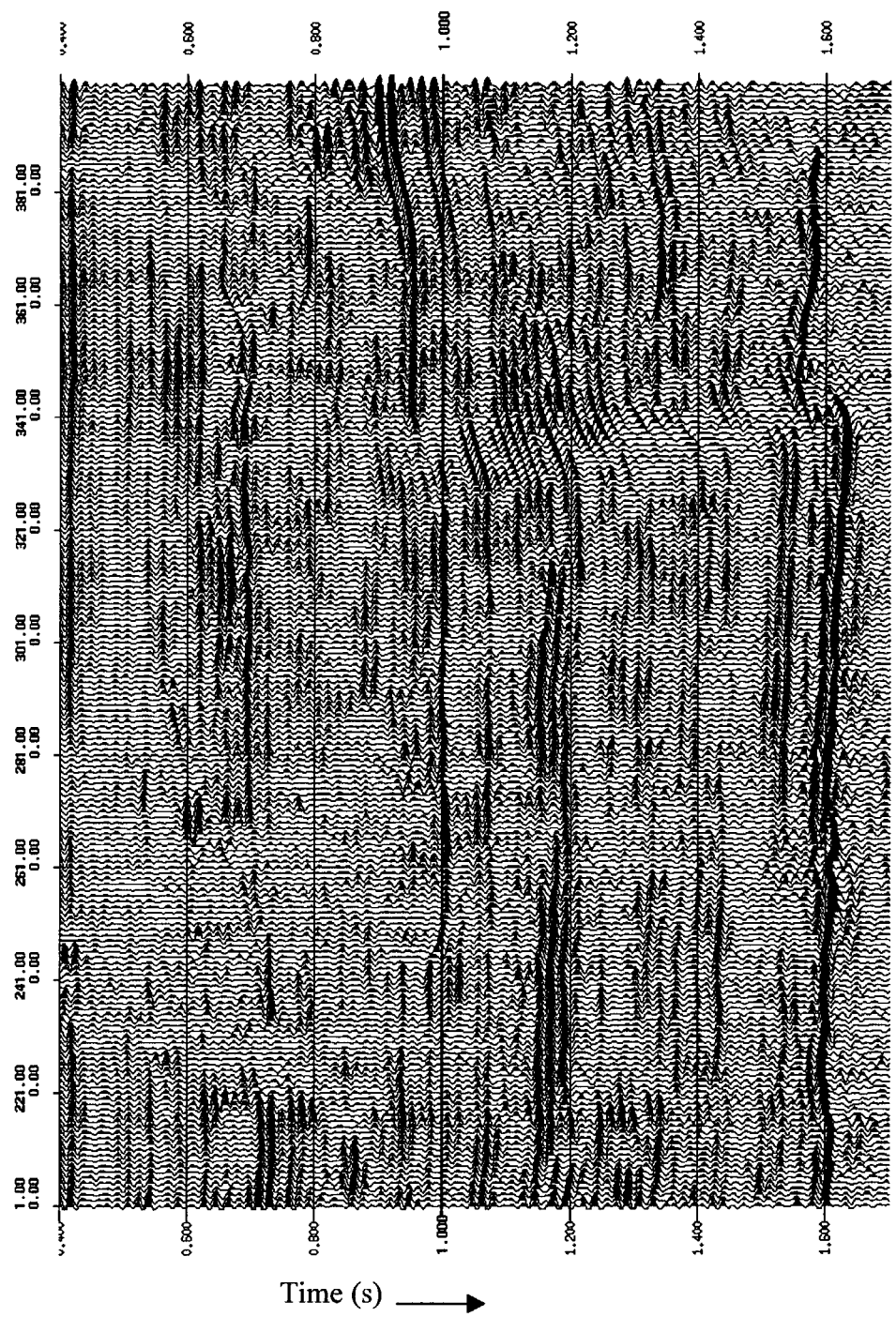
FIG. 13 illustrates an intercept section from nonlinear inversion.
Figure 14:
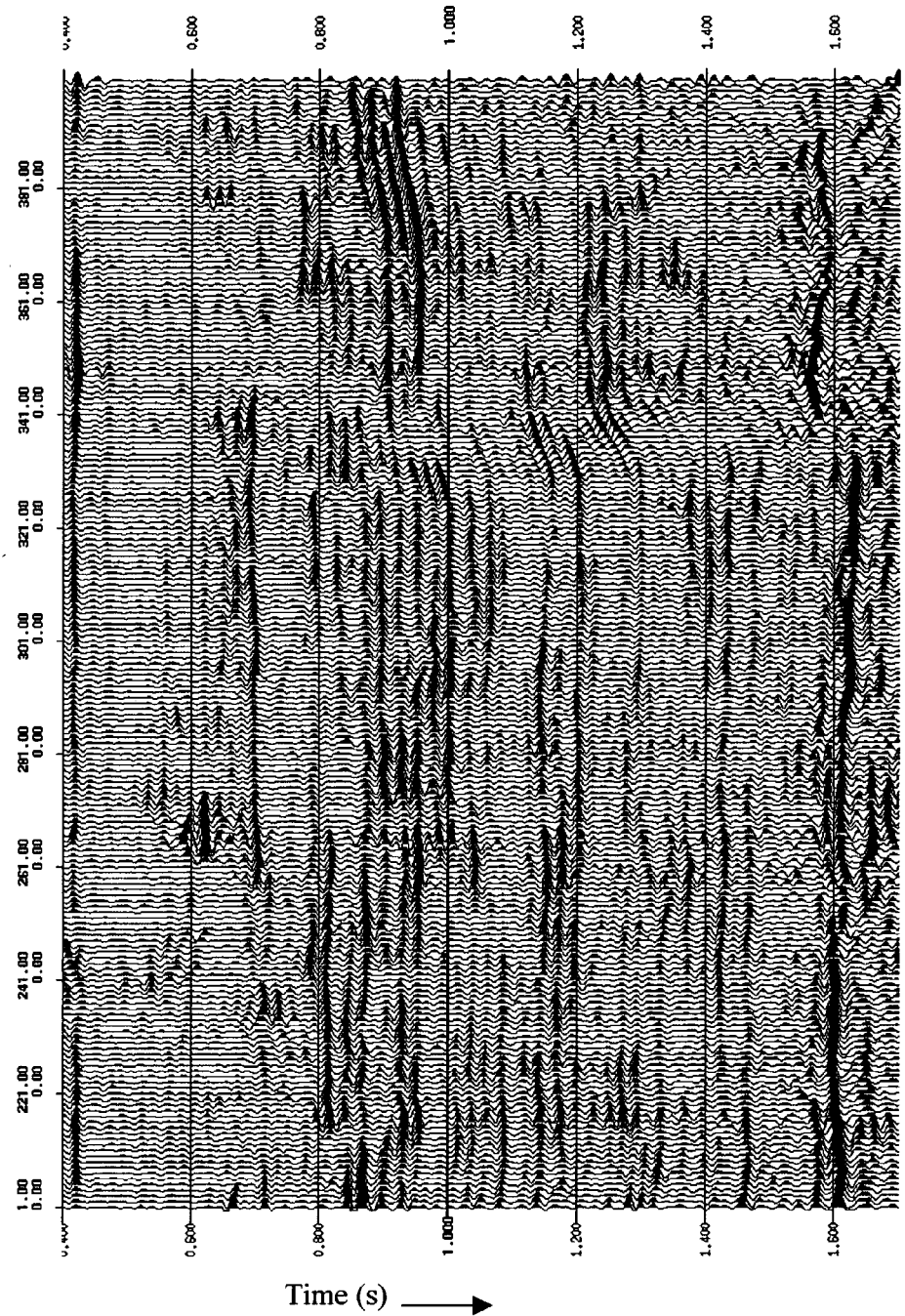
FIG. 14 illustrates a gradient section obtained from non-linear inversion.

The inversion is applied to the data set in the selected window. The source is parameterized with 2 ms sampling interval and is 240 ms long. With 2 ms sampling in data and 28 offsets there are approximately 11000 data points in a single gather. There are 650 intercept and gradient parameters and 121 source parameters that are inverted in the selected window. The standard deviation of the data is chosen to be 100% of the median value of the data in each gather. FIG. 13 shows the intercept section obtained from the nonlinear inversion. FIG. 13 indicates that the reflectors are better resolved compared to FIG. 11 and has higher frequency content. Some of the reflectors have better continuity in the intercept section than in designatured stack section of FIG. 11. The gradient section from the inversion is presented in FIG. 14. Gradients in general are more poorly determined than intercepts, because the sensitivity of gradients are weaker compared to the intercepts. Therefore, the L1-Norm constraint plays a greater role for the gradients. FIG. 14 shows that the gradient section is more spike-like compared to the intercept section in FIG. 13 and has lower frequency.

d. The AVO parameters obtained from the method of the present invention provide high frequency information. For a band limited wavelet convolved with a reflectivity series, the recovered reflectivity is band limited unless other a priori information is provided. The data alone do not contain information about the high frequency content. In this formulation we separate the model space into a smooth space and rough space using an L2-Norm and L1-Norm for the source and AVO respectively. This is essentially a priori information based on the observation that reflectivities are spiky and source wavelets are smooth. Although the data do not have high frequency information, the inverted AVO parameters contain high frequency information contributed from the L1-Norm. Caution is advised because the high frequency contribution can also come from over fitting the data, i.e. fitting the noise.

e. In prior art for prestack inversion procedures, the offset gathers are transformed to angle stacks and a wavelet estimated for each angle stack. These wavelets are estimated using standard wavelet estimation procedures on NMO corrected gathers. The rationale for estimating different wavelets in separate angle stacks is due to NMO stretch in far offsets. One question that can arise is how compatible these wavelet estimates are since the estimation in one angle stack is carried out independent of the other? This can be an important issue because the noise in different angle stacks can vary, making the estimates incompatible. However, this is not a problem with the method of the present invention because the moveout equation is explicitly considered in the forward modeling and a single wavelet is required to be inverted from a chosen window.

f. The inverse problem is solved with a robust procedure using regularization and step length search to address the ill-posed nature of the problem. The AVO parameters are bounded to obtain physically realistic solutions and are implemented using rigorous optimization procedures.

This disclosure illustrates time domain embodiments of the present invention. A frequency domain formulation is straightforward using the information contained herein. The implementation of the present invention may be carried out in many different operating systems, for example a Seismic UNIX (SU) processing system. The method of the present invention may be modularized for porting to other processing systems as well. The field example embodiment presented in this report was run on a Linux parallel cluster computer using simple data parallelism to process each CDP on its own node. Other implementations and embodiments will be apparent to those versed in the art without departing from the true scope of the invention. Further, it should be understood that the invention is not to be unduly limited to the foregoing which has been set forth for illustrative purposes. Various modifications and alternatives will be apparent to those This invention provides a nonlinear inversion for source and AVO parameters from prestack data. Prestack data can effectively be used to recover the source wavelet and AVO information provided there is enough non-parallel moveout information in the data. The invention is robust and is a useful tool for predicting reservoir properties. Some of the practical advantages for this invention are:

a. Estimating wavelets in the region where there is no well information. This need arises in many processing and analysis problems.

b. If there is adequate non-parallel moveout information in the data, the method of the present invention can allow us to separate the wavelet effect from earth parameter effects. However, if the offset range is limited such that the reflections are nearly parallel, the data may not have adequate information to distinguish between source and AVO parameters. On the other hand, imposing an L1-Norm on AVO parameters and an L2-Norm on the source supports separation of these contributions to the data.

c. In a chosen time window this method inverts for a single wavelet, essentially an effective wavelet. The method can be used to investigate wavelet variations in different time windows that may be due to propagation effects of the medium. skilled in the art without departing from the true scope of the invention as defined in the following claims.

What is claimed is:

1. A method of seismic data processing, the method comprising:
   (a) obtaining prestack seismic data containing a plurality of reflectors;
   (b) utilizing non-parallel moveout of said plurality of reflectors to determine a source wavelet using an L2-Norm and a reflectivity parameter using an L1-Norm.

2. The method of claim 1 wherein determining said source wavelet and said reflectivity parameter further comprises minimization of a model objective function.

3. The method of claim 1 further comprising determining AVO intercept and gradient parameters using said determined source wavelet and said determined reflectivity parameter.

4. The method of claim 2 wherein said model objective function is a function of at least one of i) said source wavelet, ii) a gradient parameter and iii) an intercept parameter.

5. The method of claim 1 further comprising placing physical bounds on at least one of: i) said source wavelet parameter, ii) said reflectivity parameter, and iii) AVO parameters.

6. The method of claim 5 wherein placing physical bounds on said parameters further comprises using an interior-point method.

7. The method of claim 1 further comprising preconditioning said prestack seismic data.

8. The method of claim 7 wherein preconditioning said prestack seismic data includes removing multiples.

9. The method of claim 1 further comprising normalizing said seismic data using at least one of: i) RMS values within a hyperbolic window and ii) a percentage of median values of a gather of said seismic data.

10. The method of claim 1 wherein the L1-Norm is a type chosen from at least one of:
    i) a Huber norm, ii) an Ekblom norm and iii) approximate L1-Norm measures.

11. The method of claim 1 further comprising normalizing said prestack seismic data using at least one of: i) RMS values within a hyperbolic window and ii) a percentage of median values of a gather of said prestack seismic data.

12. The method of claim 1 wherein said L1-Norms are one of a type chosen from at least one of: i) a Huber norm, ii) an Ekblom norm and iii) approximate L1-Norm measures.

13. A method of obtaining AVO parameters from seismic data, the method comprising:
    (a) obtaining prestack seismic data containing a plurality of reflectors;
    (b) utilizing non-parallel moveout of said plurality of reflectors to determine a source wavelet using an L2-Norm and AVO parameters intercept and gradient using L1-Norms.

14. The method of claim 13 wherein determining said source wavelet and said AVO parameters intercept and gradient further comprises minimization of a model objective function.

15. The method of claim 14 wherein said model objective function is a function of at least one of i) said source wavelet, ii) said AVO gradient and iii) said AVO intercept.

16. The method of claim 13 further comprising placing physical bounds on at least one of: i) said source wavelet parameters, ii) a reflectivity parameter, iii) said AVO gradient parameter and iii) said AVO intercept parameter.

17. The method of claim 16 wherein placing physical bounds on said parameters further comprises using an interior-point method.

18. The method of claim 13 further comprising preconditioning said prestack seismic data.

19. The method of claim 18 wherein preconditioning said prestack seismic data includes removing multiples.

20. A method of obtaining a source wavelet and AVO parameters from seismic data, the method comprising:
  (a) obtaining prestack seismic data containing a plurality of reflectors; and
  (b) minimizing a model objective function utilizing non-parallel moveout of said plurality of reflectors to simultaneously determine a source wavelet using an L2-Norin and an AVO parameters intercept and gradient using L1-Norms.

* * * * *

UNITED STATES PATENT AND TRADEMARK OFFICE
CERTIFICATE OF CORRECTION

PATENT NO. : 7,072,767 B2  Page 1 of 1
APPLICATION NO. : 10/404887
DATED : July 4, 2006
INVENTOR(S) : Partha Sarathi Routh, Phil D. Anno and Robert T. Baumel It is certified that error appears in the above-identified patent and that said Letters Patent is hereby corrected as shown below:

Column 16, line 63, please insert --This invention provides a nonlinear inversion for source and AVO parameters from prestack data. Prestack data can effectively be used to recover the source wavelet and AVO information provided there is enough non-parallel moveout information in the data. The invention is robust and is a useful tool for predicting reservoir properties. Some of the practical advantages for this invention are:

a. Estimating wavelets in the region where there is no well formation. This need arises in many processing and analysis problems.

b. If there is adequate non-parallel moveout information in the data, the method of the present invention can allow us to separate the wavelet effect from earth parameter effects. However, if the offset range is limited such that the reflections are nearly parallel, the data may not have adequate information to distinguish between source and AVO parameters. On the other hand, imposing an L1-Norm on AVO parameters and an L2-Norm on the source supports separation of these contributions to the data.

c. In a chosen time window this method inverts for a single wavelet, essentially an effective wavelet. The method can be used to investigate wavelet variations in different time windows that may be due to propagation effects of the medium.--

Column 17, line 50, please insert --skilled in the art without departing from the true scope of the invention as defined in the following claims.--

Signed and Sealed this

Seventh Day of November, 2006

JON W. DUDAS
*Director of the United States Patent and Trademark Office*